United States Patent
Maki et al.

(10) Patent No.: US 7,853,767 B2
(45) Date of Patent: Dec. 14, 2010

(54) DUAL WRITING DEVICE AND ITS CONTROL METHOD

(75) Inventors: Nobuhiro Maki, Yokohama (JP); Kenta Ninose, Yokohama (JP); Katsuhisa Miyata, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 514 days.

(21) Appl. No.: 11/971,366

(22) Filed: Jan. 9, 2008

(65) Prior Publication Data

US 2008/0229039 A1    Sep. 18, 2008

(30) Foreign Application Priority Data

Mar. 12, 2007   (JP) .............................. 2007-061880

(51) Int. Cl.
*G06F 12/16* (2006.01)
(52) U.S. Cl. ........................ 711/162; 709/213; 709/214; 709/216
(58) Field of Classification Search ................. 709/213, 709/214, 216
See application file for complete search history.

(56) References Cited

U.S. PATENT DOCUMENTS

| 7,360,048 B2 * | 4/2008 | Agombar et al. ............ 711/162 |
| 7,676,641 B2 * | 3/2010 | Agombar et al. ............ 711/162 |
| 2005/0073887 A1 | 4/2005 | Hirakawa et al. |
| 2009/0150630 A1 * | 6/2009 | Hiraiwa et al. .............. 711/162 |
| 2009/0187722 A1 * | 7/2009 | Iwamura et al. ............. 711/162 |

FOREIGN PATENT DOCUMENTS

| JP | 2000-330924 | 11/2000 |
| JP | 2003-183734 | 7/2003 |
| JP | 2005-018506 | 1/2005 |
| JP | 2006-114236 | 4/2006 |

OTHER PUBLICATIONS

U.S. Appl. No. 11/454,860, filed Jun. 19, 2006, N. Maki, et al.

* cited by examiner

*Primary Examiner*—Jack A Lane
(74) *Attorney, Agent, or Firm*—Antonelli, Terry, Stout & Kraus, LLP.

(57) ABSTRACT

A first storage system misrepresents an identifier of the storage system and an identifier of a volume and provides the host computer with a first volume. A second storage system misrepresents an identifier of the storage system and an identifier of a second volume as being identical to those misrepresented by the first storage system and provides the host computer with a second volume. A management computer acquires, upon detection of a failure in an access, a status of copying, a status of the first storage system, and a status of the second storage system and controls an access from the host computer with reference to the plurality of acquired statuses. Accordingly, even when a fault occurs in one of the two storage systems, a network that connects the two storage systems, or the like, the host computer can access to latest data.

17 Claims, 17 Drawing Sheets

ID MISREPRESENTATION TABLE

COPY INFORMATION TABLE

STORAGE INFORMATION TABLE

PATH GROUP MANAGEMENT TABLE

PATH DEFINITION TABLE

COPY PAIR MANAGEMENT INFORMATION

VOLUME MANAGEMENT INFORMATION

ID MISREPRESENTATION MANAGEMENT INFORMATION

I/O REQUEST

DATA TRANSFER FRAME

| | COPY STATUS OF STORAGE SYSTEM 300B | | | | | |
|---|---|---|---|---|---|---|
| | PATH DEACTIVATION | INTER-STORAGE PATH ABNORMALITY | COPY ABNORMALITY | PRIMARY OR SECONDARY VOLUME | TEMPORARILY STOPPED | INITIAL COPYING |
| COPY STATUS OF STORAGE SYSTEM 300A — PATH DEACTIVATION | IMPOSSIBLE TO CONTINUE | SPECIFIC PATH CONTROL | IMPOSSIBLE TO CONTINUE | NO CONTROL | NO CONTROL | NO CONTROL |
| INTER-STORAGE PATH ABNORMALITY | SPECIFIC PATH CONTROL | ARBITRARY PATH CONTROL | SPECIFIC PATH CONTROL | ARBITRARY PATH CONTROL | SPECIFIC PATH CONTROL | SPECIFIC PATH CONTROL |
| COPY ABNORMALITY | IMPOSSIBLE TO CONTINUE | SPECIFIC PATH CONTROL | IMPOSSIBLE TO CONTINUE | SPECIFIC PATH CONTROL | IMPOSSIBLE TO CONTINUE | IMPOSSIBLE TO CONTINUE |
| PRIMARY OR SECONDARY VOLUME | NO CONTROL | ARBITRARY PATH CONTROL | SPECIFIC PATH CONTROL | NO CONTROL | NO CONTROL | NO CONTROL |
| TEMPORARILY STOPPED | NO CONTROL | SPECIFIC PATH CONTROL | IMPOSSIBLE TO CONTINUE | NO CONTROL | NO CONTROL | NO CONTROL |
| INITIAL COPYING | NO CONTROL | SPECIFIC PATH CONTROL | IMPOSSIBLE TO CONTINUE | NO CONTROL | NO CONTROL | NO CONTROL |

*FIG. 22*

DUAL WRITING DEVICE AND ITS CONTROL METHOD

CLAIM OF PRIORITY

The present application claims priority from Japanese patent application P2007-61880 filed on Mar. 12, 2007, the content of which is hereby incorporated by reference into this application.

BACKGROUND

This invention relates to a computer system equipped with a first storage system, a second storage system, a host computer, and a management computer, and to a technology for writing data in the first storage system and in the second storage system.

In recent years, data used in a computer system of a company or the like has been growing in importance. Thus, a data protection technology is applied to the computer system. The data protection technology is for recovering data in a faulty computer system. For example, the data protection technology includes a remote copying technology.

An example of the remote copying technology is disclosed in JP 2005-18506 A. According to the remote copying technology, a first storage system stores data received from a host computer. The first storage system transmits data received from the host computer to a second storage system arranged at a physically separated place. The second storage system stores the data received from the first storage system. Even when a fault occurs, the computer system to which the remote copying technology is applied can recover from the fault within a relatively short time. To be specific, the computer system to which the remote copying technology is applied recovers from the fault by using the data stored in the second storage system.

An identification control technology of a plurality of volumes is disclosed in JP 2000-330924 A. A host computer identifies two different volumes accessed through two different paths as identical volumes. Accordingly, even when a fault occurs in one of the paths, the host computer can access data by using the other path.

SUMMARY

When one of the remote copying technology and the identification control technology of the plurality of volumes is used to write identical data in the two storage systems in a computer system, the following problems occur in the computer system.

In a computer system in which remote copies are executed in two storage systems, respectively, a host computer cannot regard volumes of the two storage systems as identical volumes. Therefore, the host computer accesses one of the two storage systems.

In the computer system adopting the identification control technology of the plurality of volumes, the host computer discretely accesses the two volumes identified as identical volumes. Therefore, it is impossible to maintain data consistency of the two volumes identified as identical volumes. It is another object of this invention to provide a computer system in which the latest data can be accessed even if a fault occurs in one of the two storage systems, a line connecting the two storage systems, or the like.

According to an exemplary embodiment of this invention, there is provided a computer system including: at least one first storage system; at least one second storage system; at least one host computer connected to the first storage system and the second storage system through a network; and a management computer capable of accessing the first storage system, the second storage system, and the host computer, in which: the first storage system: includes a first interface connected to the network, a first processor connected to the first interface, a first memory connected to the first processor, and a first disk drive for storing data requested to be written by the host computer; sets a storage area of the first disk drive as a first volume; and misrepresents an identifier of the storage system and an identifier of the first volume to provide the host computer with the set first volume; the second storage system: includes a second interface connected to the network, a second processor connected to the second interface, a second memory connected to the second processor, and a second disk drive for storing data requested to be written by the host computer; sets a storage area of the second disk drive as a second volume; and misrepresents an identifier of the storage system and an identifier of the storage volume as being identical to the identifier of the storage system and the identifier of the storage volume misrepresented by the first storage system to provide the host computer with the set second volume; the management computer includes a third interface externally connected, a third processor connected to the third interface, and a third memory connected to the third processor; and the host computer includes a fourth interface connected to the network, a fourth processor connected to the fourth interface, and a fourth memory connected to the fourth processor, the first processor copying data in the first volume to the second volume, the second processor copying data in the second volume to the first volume, the third processor, upon detection of one of a failure in an access from the host computer to the first volume and a failure in an access from the host computer to the second volume: acquires a status of copying between the first volume and the second volume and a status of the first volume from the first processor through the third interface; acquires a status of copying between the first volume and the second volume and a status of the second volume from the second processor through the third interface; and refers to the plurality of acquired statuses to control the access from the host computer to the first volume and the access from the host computer to the second volume.

According to the representative aspect of this invention, the host computer can access the latest data even if a fault occurs in one of the two storage systems, a line connecting the two storage systems, or the like.

BRIEF DESCRIPTION OF THE DRAWINGS

The present invention can be appreciated by the description which follows in conjunction with the following figures, wherein:

FIG. 22 is an explanatory diagram showing a judgment table referred to by the management computer according to the embodiment of this invention.

DETAILED DESCRIPTION OF THE PREFERRED EMBODIMENTS

The preferred embodiments of this invention will be described below with reference to the drawings.

Figure 1:
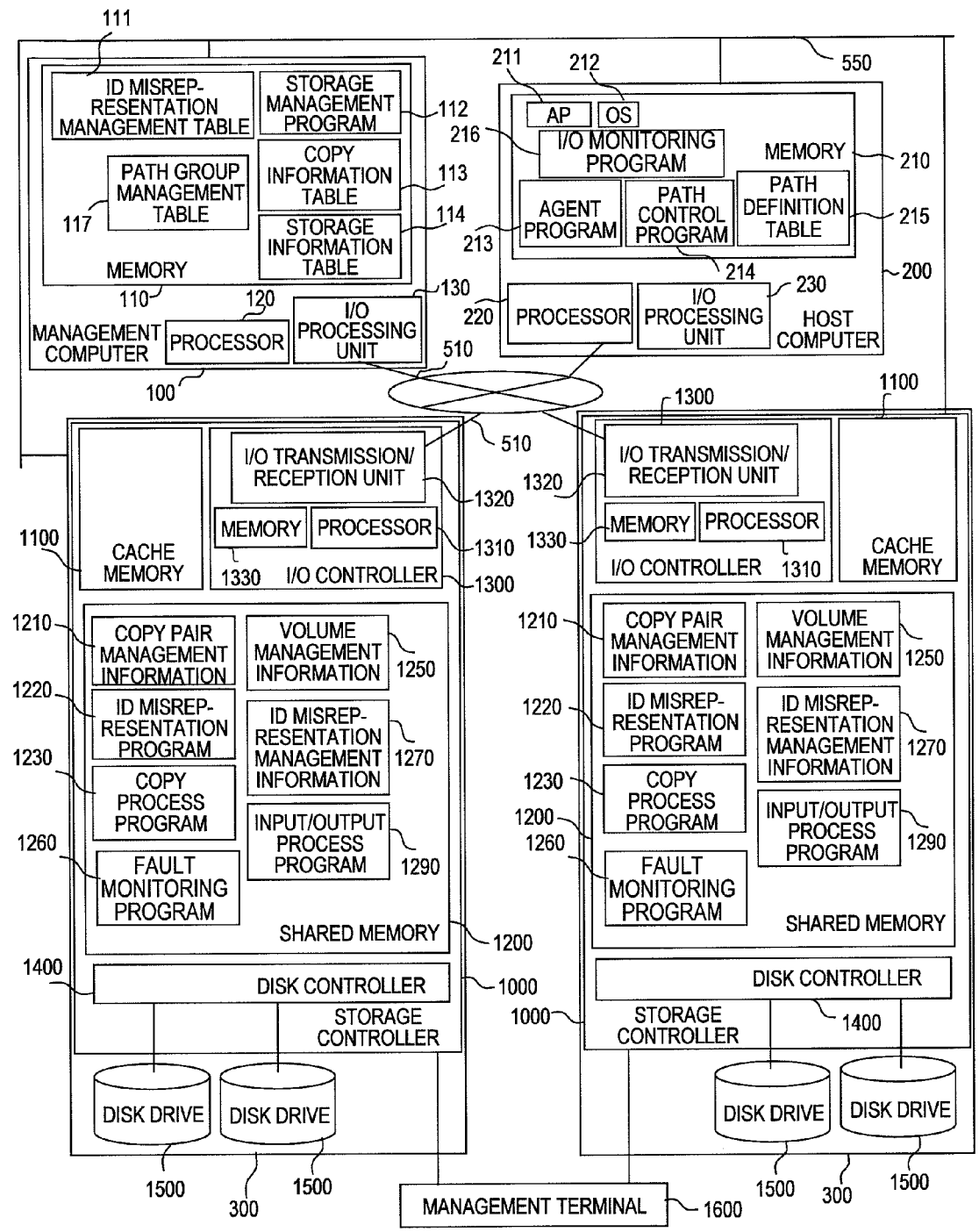
FIG. 1 is a block diagram showing a configuration of a computer system according to the embodiment of this invention.

FIG. 1 is a block diagram showing a configuration of a computer system according to the embodiment of this invention.

The computer system includes a management computer 100, a host computer 200, a storage system 300, and a management terminal 1600.

There are one management computer 100 and one host computer 200 shown in the drawing, but the numbers thereof are not limited to one. Two storage systems 300 are shown, but the number thereof is not limited to two.

The management computer 100, the host computer 200, the storage system 300, and the management terminal 1600 are interconnected through a data communication line 510. The host computer 200 is connected to the storage system 300 and the management terminal 1600 through a device control line 550.

The management computer 100 includes a memory 110, a processor 120, and an I/O processing unit 130. The memory 110, the processor 120, and the I/O processing unit 130 are interconnected through an internal network (not shown).

The processor 120 performs various processes by executing programs stored in the memory 110. For example, the processor 120 transmits an I/O request to the storage system 300 to thereby control remote copying executed by the storage system 300. The I/O request includes a writing request, a reading request, and a remote-copying control request. The I/O request will be described below in detail with reference to FIG. 13.

The memory 110 stores the programs to be executed by the processor 120, and information or the like to be required by the processor 120. To be specific, the memory 110 stores an ID misrepresentation management table 111, a storage management program 112, a copy information table 113, a storage information table 114, and a path group management table 117. The memory 110 may further store an operating system (OS) and an application program (AP).

The storage management program 112 manages the storage system 300 connected through the device control line 550.

The ID misrepresentation management table 111 contains information for managing a logical volume in which a storage ID and a logical volume ID are misrepresented. The ID misrepresentation management table 111 will be described below in detail with reference to FIG. 5. The logical volume of the misrepresented storage ID and logical volume ID will be described below in detail with reference to FIG. 2.

The copy information table 113 contains information for managing a configuration and a status of a bi-directional synchronous copy. Accordingly, the memory 110 stores copy information tables 113 as many as the bi-directional synchronous copies managed by the management computer 100. The copy information table 113 will be described below in detail with reference to FIG. 6. The bi-directional synchronous copy will be described below in detail with reference to FIG. 3.

The storage information table 114 contains information regarding the storage system 300 managed by the management computer 100. The storage information table 114 will be described below in detail with reference to FIG. 7.

The path group management table 117 contains information for managing a path. The path group management table 117 will be described below in detail with reference to FIG. 8.

The path is a logical data communication line that connects the host computer 200 and a logical volume of the storage system 300. An inter-storage path is a logical data communication line that connects two storage systems 300. The inter-storage path may be a physical data communication line (a leased line) that connects the two storage systems 300.

The I/O processing unit 130 is an interface connected to the host computer 200 and to the storage system 300 through the data communication line 510.

The host computer 200 includes a memory 210, a processor 220, and an I/O processing unit 230.

The memory 210, the processor 220, and the I/O processing unit 230 are interconnected through an internal network (not shown).

The processor 220 performs various processes by executing programs stored in the memory 210. For example, the processor 220 transmits an I/O request to the storage system 300 to thereby access a logical volume supplied from the storage system 300.

The memory 210 stores the programs to be executed by the processor 220, and information or the like to be required by the processor 220. To be specific, the memory 210 stores an application program (AP) 211, an OS 212, an agent program 213, a path control program 214, a path definition table 215, and an I/O monitoring program 216.

The AP 211 executes various processes. For example, the AP 211 provides a database function or a WEB server function. The OS 212 controls the entire process of the host computer 200.

The agent program 213 receives an instruction from the management computer 100. The path control program 214 controls a path used for accessing the logical volume of the storage system 300. The path control program 214 controls the path by referring to the path definition table 215.

The I/O monitoring program 216 monitors an access from the host computer 200 to the logical volume of the storage system 300.

The path definition table 215 contains information regarding the path used for accessing the logical volume of the storage system 300. The path definition table 215 will be described below in detail with reference to FIG. 9.

The I/O processing unit 230 is an interface connected to the management computer 100 and to the storage system 300 through the data communication line 510. To be specific, the I/O processing unit 230 transmits an I/O request to the storage system 300.

The storage system 300 includes a storage controller 1000 and a disk drive 1500.

The disk drive 1500 stores data requested to be written by the host computer 200.

The storage controller 1000 controls the entire storage system 300. To be specific, the storage controller 1000 controls data writing in the disk drive 1500 and data reading from the disk drive 1500. The storage controller 1000 supplies a storage area of the disk drive 1500 as one or more logical volumes to the host computer 200. At this time, the storage controller 1000 misrepresents a storage ID and a logical volume ID to supply a logical volume to the host computer 200.

The storage controller 1000 includes a cache memory 1100, a shared memory 1200, an I/O controller 1300, and a disk controller 1400.

The cache memory 1100, the shared memory 1200, the I/O controller 1300, and the disk controller 1400 are interconnected through an internal network (not shown).

The cache memory 1100 temporarily stores data written in the disk drive 1500 and data read from the disk drive 1500.

The disk controller 1400 controls the data writing in the disk drive 1500 and the data reading from the disk drive 1500.

The I/O controller 1300 includes a processor 1310, an I/O transmission/reception unit 1320, and a memory 1330. The processor 1310, the I/O transmission/reception unit 1320, and the memory 1330 are interconnected through an internal network (not shown).

The I/O transmission/reception unit 1320 is an interface connected to the management computer 100, the host computer 200, and the other storage system 300 through the data communication line 510. To be specific, the I/O transmission/reception unit 1320 receives the I/O request from the management computer 100 or from the host computer 200. The I/O transmission/reception unit 1320 transmits the data read from the disk drive 1500 to the management computer 100 or the host computer 200. Further, the I/O transmission/reception unit 1320 transmits/receives data exchanged between the storage systems 300.

The processor 1310 performs various processes by executing programs stored in the memory 1330 or the shaped memory 1200. To be specific, the processor 1310 processes the I/O request received by the I/O transmission/reception unit 1320.

The memory 1330 stores the programs to be executed by the processor 1310, and information or the like to be required by the processor 1310.

The shared memory 1200 stores the programs to be executed by the processor 1310, and information or the like to be required by the processor 1310. The shared memory 1200 stores programs to be executed by the disk controller 1400, and information or the like to be required by the disk controller 1400. To be specific, the shared memory 1200 stores copy pair management information 1210, an ID misrepresentation program 1220, a copy process program 1230, volume management information 1250, a fault monitoring program 1260, ID misrepresentation management information 1270, and an input/output process program 1290.

The copy pair management information 1210 is for managing a copy pair including the logical volume supplied from the storage system 300. The copy pair is constituted of two logical volumes targeted for bi-directional synchronous copy. The bi-directional synchronous copy will be described below in detail with reference to FIG. 3. The copy pair management information 1210 will be described below in detail with reference to FIG. 10.

The ID misrepresentation program 1220 misrepresents a storage ID and a logical volume ID, and supplies a logical volume to the host computer 200. The copy process program 1230 executes initial copy and bi-directional synchronous copy.

The fault monitoring program 1260 monitors a fault that occurs in the storage system 300 or the inter-storage path. When a fault is detected, the fault monitoring program 1260 executes a process corresponding to the details of the fault detected. The input/output process program 1290 processes the I/O request received by the I/O transmission/reception unit 1320.

The volume management information 1250 is for managing the logical volume supplied from the storage system 300. The volume management information 1250 will be described below in detail with reference to FIG. 11.

The ID misrepresentation management information 1270 is for misrepresenting the storage ID and the logical volume ID when the logical volume is supplied to the host computer 200. The ID misrepresentation management information 1270 will be described below in detail with reference to FIG. 12.

The management terminal 1600 is connected to the storage controller 1000 disposed in the storage system 300. The management terminal 1600 is a computer equipped with a processor, a memory, and an interface. The management terminal 1600 transmits information input by a system user to the storage controller 1000 of the storage system 300.

Next, an outline of a process according to the embodiment of this invention will be described.

Figure 2:
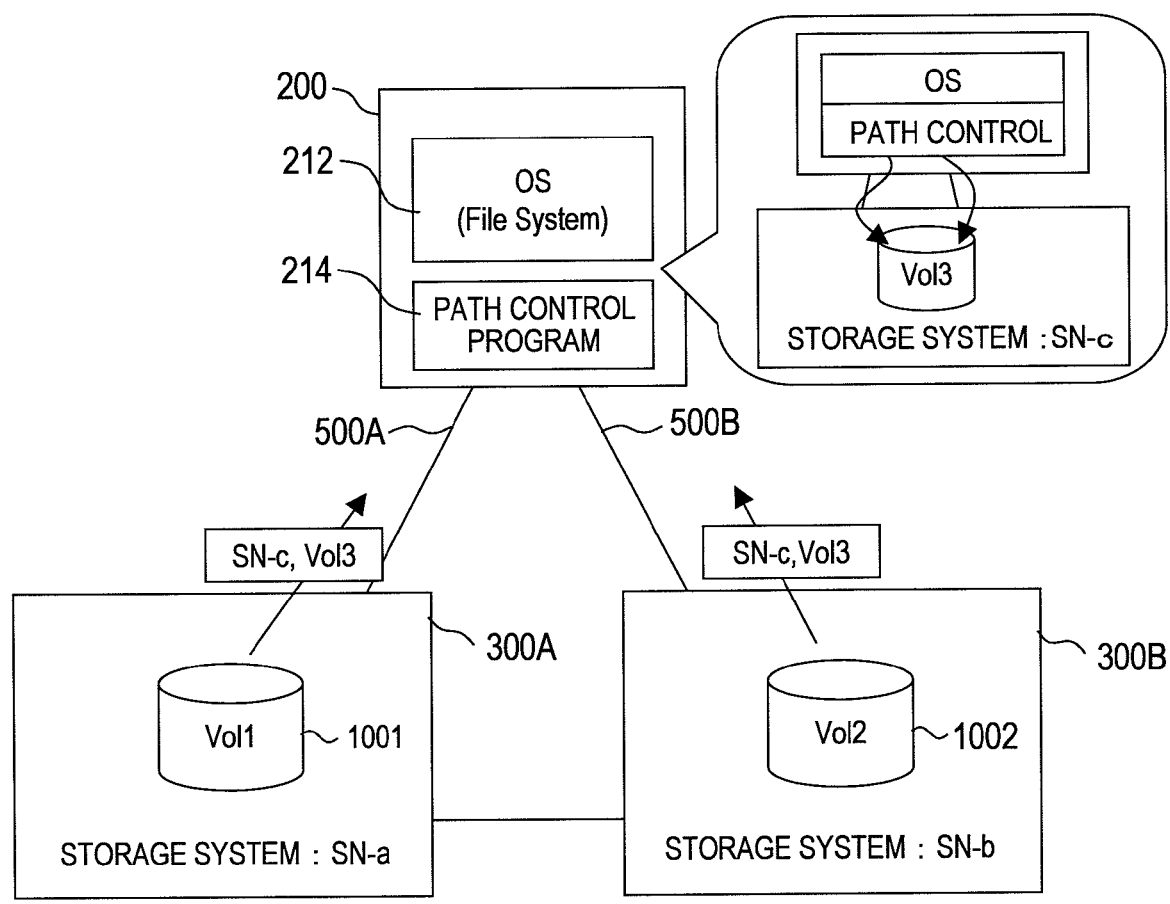
FIG. 2 is an explanatory diagram showing an ID misrepresentation process performed by the storage system according to the embodiment of this invention.

FIG. 2 is an explanatory diagram showing an ID misrepresentation process performed by the storage system 300 according to the embodiment of this invention.

The storage system 300 misrepresents a storage ID and a logical volume ID to supply a logical volume to the host computer 200.

For example, a storage system 300A supplies a logical volume 1001 as logical volume identified by a logical volume ID "Vol3" in a virtual storage system identified by a storage ID "SN-c" to the host computer 200.

A storage system 300B supplies a logical volume 1002 as a logical volume identified by a logical volume ID "Vol3" in a virtual storage system identified by a storage ID "SN-c" to the host computer 200.

The host computer 200 accesses the logical volume 1001 of the storage system 300A by using a path 500A. The host computer 200 accesses the logical volume 1002 of the storage system 300B by using a path 500B.

The host computer 200 identifies a logical volume based on a storage ID and a logical volume ID. Accordingly, the host computer 200 identifies the logical volume 1001 of the storage system 300A and the logical volume 1002 of the storage system 300B as identical logical volumes.

As an example, description will be made of a case where the host computer 200 accesses the logical volume identified by the logical volume ID "Vol3" in the virtual storage system identified by the storage ID "SN-c".

In this case, the host computer 200 accesses the logical volume by equally using the path 500A and the path 500B. In other words, the host computer 200 equally accesses the logical volume 1001 of the storage system 300A and the logical volume 1002 of the storage system 300B.

However, when data is written in one logical volume by using a plurality of paths, the host computer 200 does not write any subsequent data until writing of one data is completed.

Figure 3:
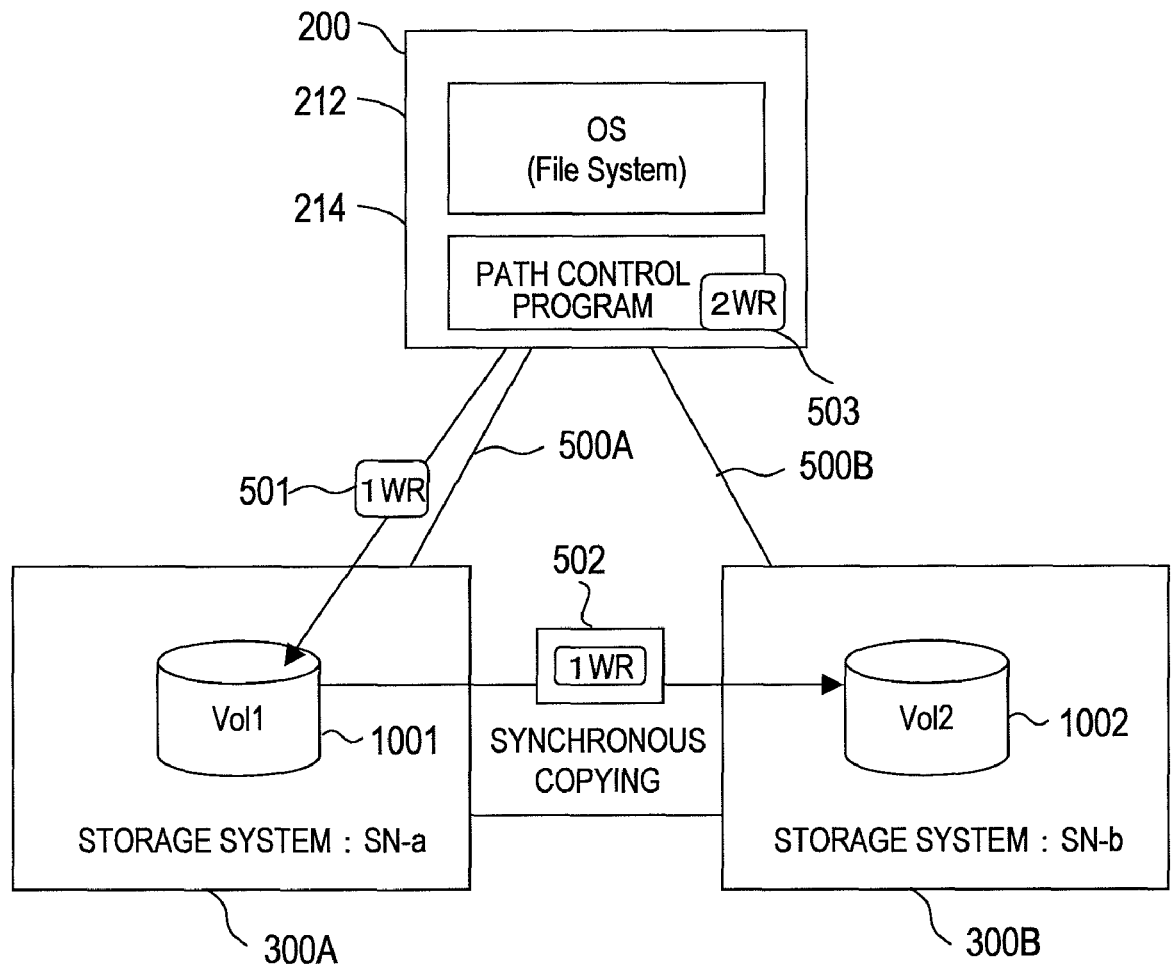
FIG. 3 is an explanatory diagram showing the bi-directional synchronous copy process performed by the storage systems according to the embodiment of this invention.

FIG. 3 is an explanatory diagram showing the bi-directional synchronous copy process performed by the storage systems 300 according to the embodiment of this invention.

Each of the storage systems 300 executes bi-directional synchronous copy upon writing of data requested to be written by the host computer 200 in a logical volume. Accordingly, the storage systems 300 have consistency of data stored in two logical volumes identified as identical logical volumes by the host computer 200.

As an example, description will be made of a case where the host computer 200 transmits a writing request 501 to the storage system 300A through the path 500A. The writing request 501 requests writing of data in the logical volume 1001 of the storage system 300A.

The storage system 300A receives the writing request 501 from the host computer 200. Then, the storage system 300A suspends writing in the logical volume 1001 requested by the received writing request 501.

The storage system 300A copies in synchronization the write data 502 contained in the writing request 501 in the logical volume 1002 of the storage system 300B.

Here, the synchronous copying process performed by the storage system 300A will be described. The storage system 300A remote-copies the write data 502 contained in the writing request 501 in the logical volume 1002 of the storage system 300B. To be specific, the storage system 300A executes remote-copying by transmitting a data transfer frame containing the write data 502. The data transfer frame will be described below in detail with reference to FIG. 14.

Then, when the remote copy of the write data 502 is completed, the storage system 300A executes writing of a suspended status. In other words, the storage system 300A writes the write data contained in the received writing request 501 in the logical volume 1001. The storage system 300A notifies the host computer 200 of the completion of a process of the writing request 501.

Next, description will be made of a case where the host computer 200 transmits a writing request to the storage system 300B through the path 500B. The writing request requests data writing in the logical volume 1002 of the storage system 300B.

The storage system 300B receives the writing request from the host computer 200. Then, the storage system 300B suspends writing in the logical volume 1002 requested by the received writing request. Further, the storage system 300B remote-copies the write data contained in the writing request in the logical volume 1001 of the storage system 300A. Upon completion of the remote-copying of the write data, the storage system 300B notifies the host computer 200 of the completion of processing the writing request.

When the remote copy of the write data is completed, the storage system 300B executes writing of a suspended status. In other words, the storage system 300B writes the write data contained in the received writing request in the logical volume 1001. The storage system 300B notifies the host computer 200 of the completion of a process of the writing request.

Thus, the storage system 300A and the storage system 300B execute the bi-directional synchronous copy upon reception of the data writing requests. The synchronous copying executed in two-way is bi-directional synchronous copy.

As a result, the data stored in the logical volume 1001 of the storage system 300A matches the data stored in the logical volume 1002 of the storage system 300B.

According to this embodiment, the host computer 200 does not transmit a next writing request 503 to the storage system 300 unless notification of the completion of processing the writing request 501 is given. In other words, the host computer 200 sequentially issues writing requests with respect to one logical volume. Thus, the host computer 200 can maintain the sequence of data writing in the identical logical volumes.

In other words, the host computer 200 does not simultaneously access the two logical volumes identified as identical logical volumes. In this explanatory diagram, the host computer 200 does not simultaneously access the logical volume 1001 of the storage system 300A and the logical volume 1002 of the storage system 300B.

As described above, according to this embodiment, the host computer 200 accesses a logical volume by using a plurality of paths 500. Hence, the host computer 200 can obtain the same data regardless of which one of the plurality of paths 500 is used for accessing the logical volume.

On the other hand, when bi-directional synchronous copy is not executed, the data stored in the logical volume 1001 of the storage system 300A does not match the data stored in the logical volume 1002 of the storage system 300B. In this case, data obtained by the host computer 200 varies depending on a path used for accessing the logical volume.

Description will be made of a case where a fault occurs in any one of the storage system 300A, the storage system 300B, and the inter-storage path.

Figure 4:
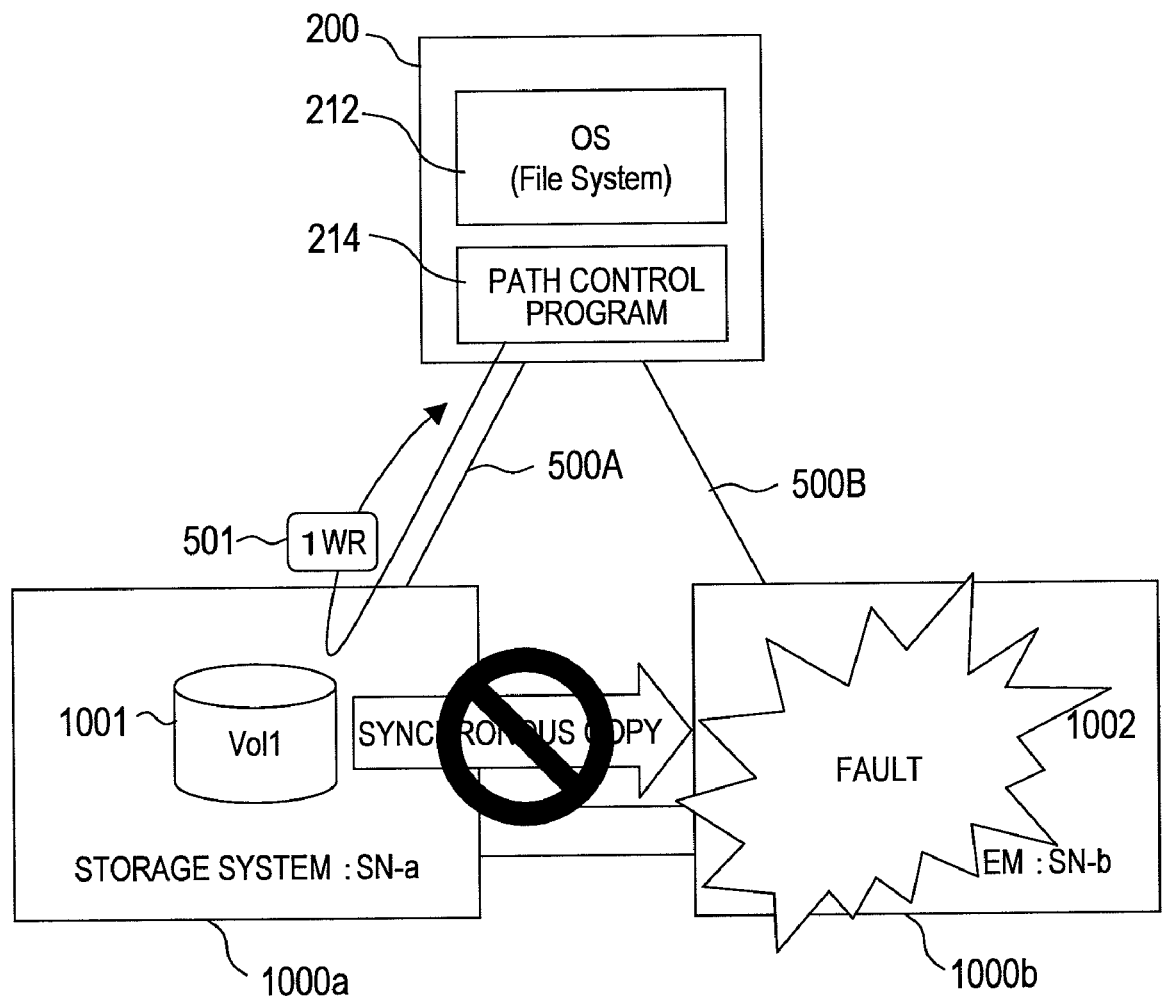
FIG. 4 is an explanatory diagram showing a volume access control process performed by the storage system according to the embodiment of this invention.

FIG. 4 is an explanatory diagram showing a process of the storage system 300 at the time of occurrence of a fault according to the embodiment of this invention.

This explanatory diagram shows a process in the case where a fault has occurred in the storage system 300B during a remote copy process.

The storage system 300A receives a writing request 501 from the host computer 200. Then, the storage system 300A brings writing in the logical volume 1001 requested by the received writing request 501 into a suspended status. Moreover, the storage system 300A attempts to remotely copy the write data contained in the writing request 501 to the logical volume 1002 of the storage system 300B. However, since the fault has occurred in the storage system 300B, the storage system 300A fails in the remote copy.

Thus, the storage system 300A temporarily stops the remote copy. Moreover, the storage system 300A suspends the writing in the logical volume 1001 being in the suspended status. The storage system 300 notifies the host computer 200 of the failure in a process of the writing request 501. Thereafter, the storage system 300A rejects reception of a request for writing in the logical volume 1001.

Upon reception of the notification of the failure in a process of the writing request 501, the host computer 200 notifies the management computer 100 of an I/O fault. Upon reception of the notification of the I/O fault, the management computer 100 transmits an I/O request to the storage system 300A and the storage system 300B. The I/O request is a request for acquisition of a status of the remote copy.

Upon receipt of the I/O request, the storage system 300 transmits a status of the remote copy to the management computer 100 as a response to the I/O request received.

Specifically, the storage system 300A receives the I/O request. Then, the storage system 300A transmits an abnormal status of the inter-storage path to the management computer 100 as a response to the I/O request received. The abnormal status of the inter-storage path indicates a status in which a fault occurs in the inter-storage path or the storage system 300B of the copying destination.

Therefore, in the case of the abnormal status of the inter-storage path, the storage system 300A cannot execute bi-directional synchronous copy. However, data stored in the logical volume 1001 included in the storage system 300A is normal.

On the other hand, upon receipt of the I/O request, the storage system 300B transmits an abnormal status of copy to the management computer 100 as a response to the I/O request received. The abnormal status of copy indicates a state in which the operation of the storage system 300B is stopped because of a fault during initial copy or a status in which a fault has occurred in the storage system 300B.

Therefore, in the case of the abnormal status of copy, the storage system 300B cannot execute bi-directional synchronous copy. Moreover, it is likely that data stored in the logical volume 1002 included in the storage system 300B is broken.

The management computer 100 receives statues of remote copy from the storage systems 300A and 300B. Subsequently, the management computer 100 performs a process corresponding to the statuses of remote copy received.

The management computer 100 instructs the host computer 200 to deactivate a path connecting the host computer 200 and the storage system 300B. The host computer 200 deactivates the path instructed to be deactivated. Moreover, the management computer 100 instructs the storage system 300A to release the rejection of reception of a request for writing in the logical volume 1001.

Thereafter, the host computer 200 transmits the writing request 501, failure in a process of which is notified, to the storage system 300A again. Since the path connecting the host computer 200 and the storage system 300B is deactivated, the host computer 200 transmits the writing request 501 to the storage 300A rather than the storage system 300B.

The storage system 300A receives the writing request 501. Since the rejection of reception of a request for writing in the logical volume 1001 is released, the storage system 300A writes write data contained in the received writing request in the logical volume 1001.

Figure 5:
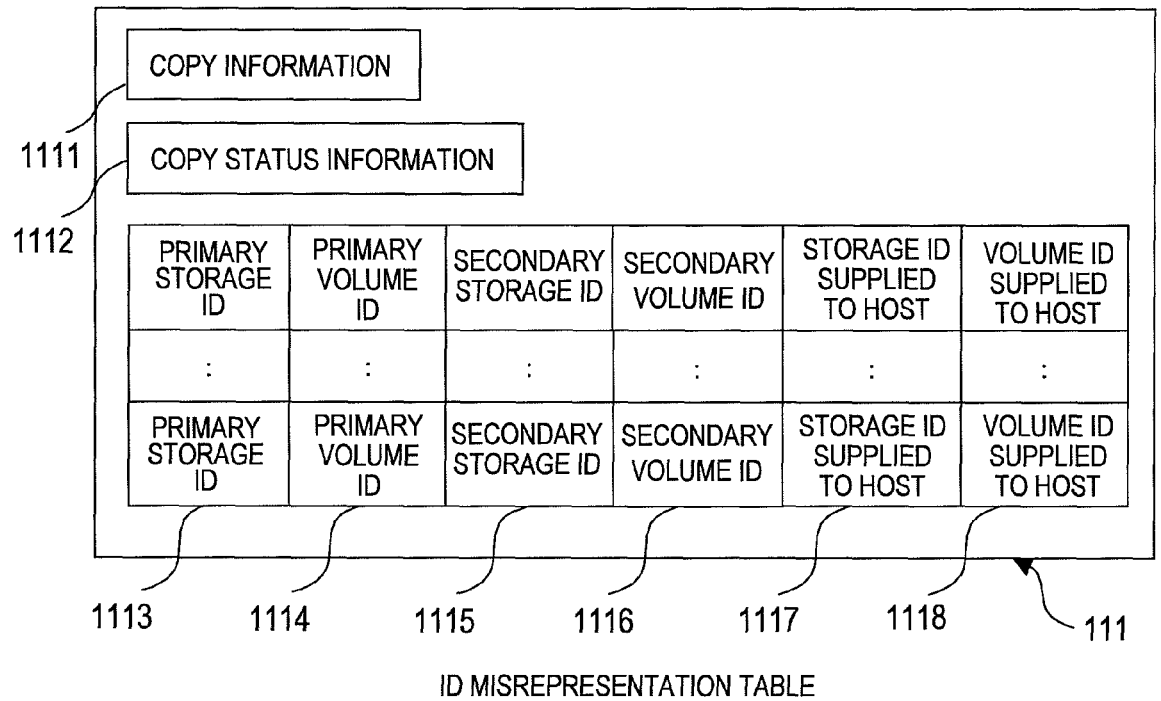
FIG. 5 is a diagram showing a structure of the ID misrepresentation management table stored in the management computer according to the embodiment of this invention.

FIG. 5 is a diagram showing a structure of the ID misrepresentation management table 111 stored in the management computer 100 according to the embodiment of this invention.

The ID misrepresentation management table 111 contains copy information 1111, copy status information 1112, and ID misrepresentation information.

The copy information 1111 includes a copy type and copy option information.

The copy type indicates which one of synchronous copying, asynchronous copying, bi-directional synchronous copy, and bi-directional asynchronous copy is executed for the logical volume managed by the ID misrepresentation management table 111. In this embodiment, the bi-directional synchronous copying is stored as the copy type.

The copy option information indicates whether it is possible to write data in a logical volume identified by a secondary volume ID 1116 during suspension of the bi-directional synchronous copy. The suspension of the bi-directional synchronous copy means suspension of the bi-directional synchronous copy based on an instruction given by the management computer 100.

The copy status information 1112 indicates a current copying status in the logical volume managed by the ID misrepresentation management table 111. The ID misrepresentation management table 111 contains the copy status information 1112 concerning the logical volume identified by a primary volume ID 1114 and the copy status information 1112 concerning the logical volume identified by a secondary volume ID 1116.

To be specific, the copy status information 1112 indicates which one of an initial copy status, a suspension status, a pair status, an abnormal status of the inter-storage path, and an abnormal status of copy corresponds to the copying status in the logical volume.

If the initial copy status is stored in the copy status information 1112, initial copy is being executed from a logical volume identified by a primary volume ID 1114 to a logical volume identified by a secondary volume ID 1116.

The initial copy is a process performed immediately after start of operation of a computer system in which bi-directional synchronous copy is executed. Specifically, the storage system 300 initially copies data of a logical volume being operated to logical volumes of other storage systems 300. The process of the initial copy will be described in detail with reference to FIG. 16.

If the suspension status is stored in the copy status information 1112, the storage system 300 suspends the bi-directional synchronous copy. Thus, data of the logical volume identified by the primary volume ID 1114 does not match data of the logical volume identified by the secondary volume ID 1116.

If the pair status is stored in the copy status information 1112, data stored in the logical volume identified by the primary volume ID 1114 and data stored in the logical volume identified by the secondary volume ID 1116 are identical.

If an abnormal status of the inter-storage path is stored in the copy status information 1112 concerning the logical volume identified by the primary volume ID 1114, a fault has occurred in the inter-storage path or the storage system 300 identified by the secondary storage ID 1115. The storage system 300 identified by the primary storage ID 1113 is in a normal status. In this case, the storage system 300 cannot execute bi-directional synchronous copy for the logical volume identified by the primary volume ID 1114. However, the data stored in the logical volume identified by the primary volume ID 1114 is normal.

When an abnormal status of the inter-storage path is stored in the copy status information 1112 concerning the logical volume identified by the secondary volume ID 1116, a fault has occurred in the inter-storage path or the storage system 300 identified by the primary storage ID 1113. The storage system 300 identified by the secondary storage ID 1115 is in a normal status. In this case, the storage system 300 cannot execute bi-directional synchronous copy for the logical volume identified by the secondary volume ID 1116. However, the data stored in the logical volume identified by the secondary volume ID 1116 is normal.

When an abnormal status of copy is stored in the copy status information 1112 concerning the logical volume identified by the primary volume ID 1114, this indicates a status in which the operation of the storage system 300 identified by the primary storage ID 1113 is stopped because of a fault during the initial copy or a status in which a fault has occurred in the storage system 300 identified by the primary storage ID 1113. In this case, the storage system 300 cannot execute bi-directional synchronous copy for the logical volume identified by the primary volume ID 1114. Moreover, it is likely that the data stored in the logical volume identified by the primary volume ID 1114 is broken.

When an abnormal status of copy is stored in the copy status information 1112 concerning the logical volume identified by the secondary volume ID 1116, this indicates a status in which the operation of the storage system 300 identified by the secondary storage ID 1115 is stopped because of a fault during the initial copy or a status in which a fault has occurred in the storage system 300 identified by the secondary storage ID 1115. In this case, the storage system 300 cannot execute bi-directional synchronous copy for the logical volume identified by the secondary volume ID 1116. Moreover, it is likely that the data stored in the logical volume identified by the secondary volume ID 1116 is broken.

The ID misrepresentation information includes a primary storage ID 1113, a primary volume ID 1114, a secondary storage ID 1115, a secondary volume ID 1116, a storage ID 1117 supplied to a host, and a volume ID 1118 supplied to the host.

The primary storage ID 1113 is a unique identifier of a storage system (primary storage system) 300 which supplies a logical volume of a copying source in initial copy. The primary volume ID 1114 is a unique identifier of the logical volume (primary volume) of the copying source in the initial copy.

The secondary storage ID 1115 is a unique identifier of a storage system (secondary storage system) 300 which supplies a logical volume of a copying destination in the initial copy. The secondary volume ID 1116 is a unique identifier of the logical volume (secondary volume) of the copying destination in the initial copy.

The storage ID 1117 supplied to the host is an identifier which enables the host computer 200 to identify the storage system 30 equipped with a primary volume and the storage system 30 equipped with a secondary volume.

The storage system 300 identified by the primary storage ID 1113 misrepresents its own identifier as the storage ID 1117 supplied to the host, and supplies the misrepresented identifier to the host computer 200. Similarly, the storage system 300 identified by the secondary storage ID 1115 misrepresents its own identifier as the storage ID 1117 supplied to the host, and supplies the misrepresented identifier to the host computer 200.

Accordingly, the host computer 200 identifies the storage system 300 having the logical volume identified by the primary volume ID 1114 and the storage system 300 having the logical volume identified by the secondary volume ID 1116, based on the storage ID 1117 supplied to the host.

The volume ID 1118 supplied to the host is an identifier which enables the host computer 200 to identify the primary volume and the secondary volume.

The storage system 300 identified by the primary storage ID 1113 misrepresents an identifier of the logical volume identified by the primary volume ID 1114 as the volume ID 1118 supplied to the host, and supplies the logical volume to the host computer 200. Similarly, the storage system 300 identified by the secondary storage ID 1115 misrepresents the identifier of the logical volume identified by the secondary volume ID 1116 as the volume ID 1118 supplied to the host, and supplies the logical volume to the host computer 200.

Accordingly, the host computer 200 identifies the logical volume identified by the primary volume ID 114 and the logical volume identified by the secondary volume ID 1116, based on the volume ID 1118 supplied to the host. As a result, the host computer 200 identifies the logical volumes identified by the primary volume ID 1114 and the secondary volume ID 1116 as being identical.

Figure 6:
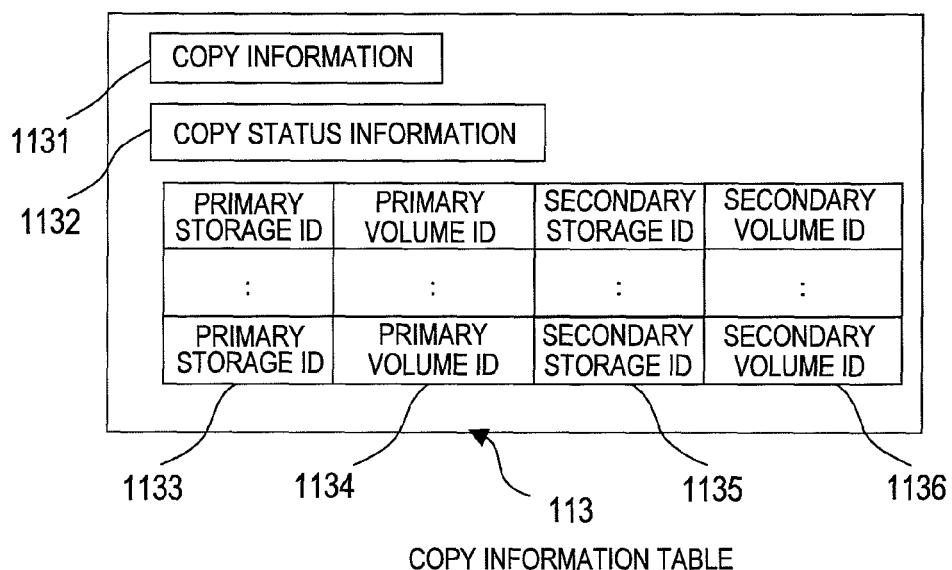
FIG. 6 is a diagram showing a structure of the copy information table stored in the management computer according to the embodiment of this invention.

FIG. 6 is a diagram showing a structure of the copy information table 113 stored in the management computer 100 according to the embodiment of this invention.

The copy information table 113 contains copy information 1131, copy status information 1132, and copy configuration information.

The copy information 1131 includes a copy type and copy option information. The copy type indicates which one of synchronous copying and asynchronous copying corresponds to the copying managed by the copy information table 113 is. The copy option information indicates whether it is possible to write data in the secondary volume during suspension of the bi-directional synchronous copy. The suspension of the bi-directional synchronous copy means suspension of the bi-directional synchronous copy based on an instruction given by the management computer 100.

The copy status information 1132 indicates a current copying status in the logical volume managed by the copy information table 113. To be specific, the copy status information 1132 indicates which one of an initial copy status, a suspension status, a pair status, an abnormal status of the inter-storage path, and an abnormal status of copy corresponds to the copying status managed by the copy information table 113.

The copy configuration information includes a primary storage ID 1133, a primary volume ID 1134, a secondary storage ID 1135, and a secondary volume ID 1136.

The primary storage ID 1133 is a unique identifier of a storage system (primary storage system) 300 which supplies a logical volume of a copying source in initial copy. The primary volume ID 1134 is a unique identifier of the logical volume (primary volume) of the copying source in the initial copy.

The secondary storage ID 1135 is a unique identifier of a storage system (secondary storage system) 300 which supplies a logical volume of a copying destination in the initial copy. The secondary volume ID 1136 is a unique identifier of the logical volume (secondary volume) of the copying destination in the initial copy.

Figure 7:
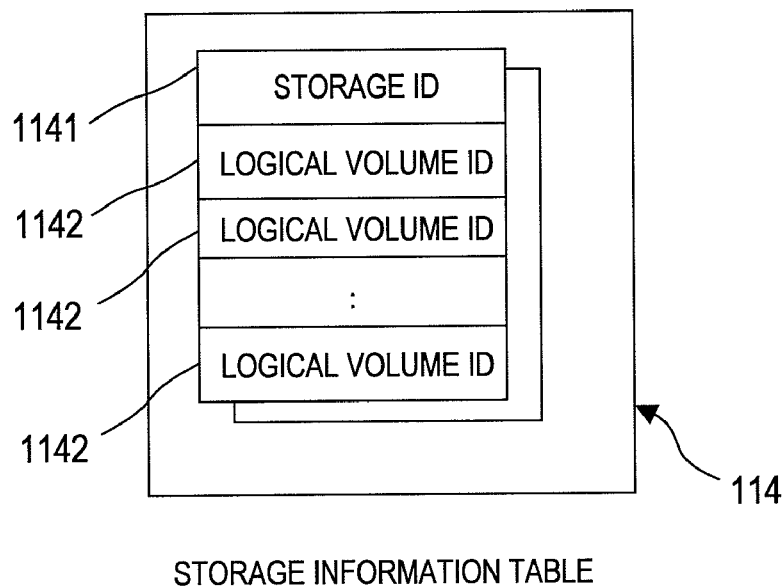
FIG. 7 is a diagram showing a structure of the storage information table stored in the management computer according to the embodiment of this invention.

FIG. 7 is a diagram showing a structure of the storage information table 114 stored in the management computer 100 according to the embodiment of this invention.

The storage information table 114 contains a storage ID 1141 and a logical volume ID 1142.

The storage ID 1141 is a unique identifier of a storage system 300 managed by the management computer 100. The logical volume ID 1142 is a unique identifier of the logical volume supplied by the storage system 300 identified by storage ID 1141.

Figure 8:
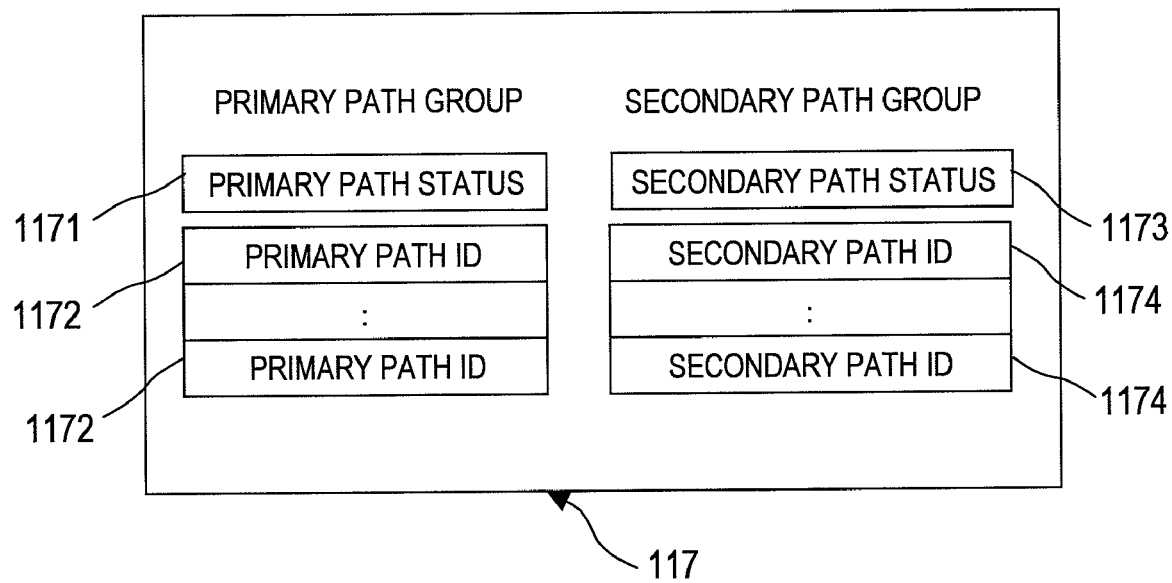
FIG. 8 is a diagram showing a structure of the path group management table stored in the management computer according to the embodiment of this invention.

FIG. 8 is a diagram showing a structure of the path group management table 117 stored in the management computer 100 according to the embodiment of this invention.

The path group management table 117 contains information regarding a primary path group and information regarding a secondary path group.

The information regarding the primary path group contains a primary path status 1171 and a primary path ID 1172.

The primary path ID 1172 is a unique identifier of a path (primary path) used for accessing a primary volume. The primary path status 1171 is a status of a path identified by the primary path ID 1172. To be specific, the primary path status 1171 indicates whether a primary volume can be accessed or not by using the path identified by the primary path ID 1172.

The information regarding the secondary path group contains a secondary path status 1173 and a secondary path ID 1174.

The secondary path ID 1174 is a unique identifier of a path (secondary path) used for accessing a secondary volume. The secondary path status 1173 is a status of a path identified by the secondary path ID 1174. To be specific, the secondary path status 1173 indicates whether a secondary volume can be accessed or not by using the path identified by the secondary path ID 1174.

Figure 9:
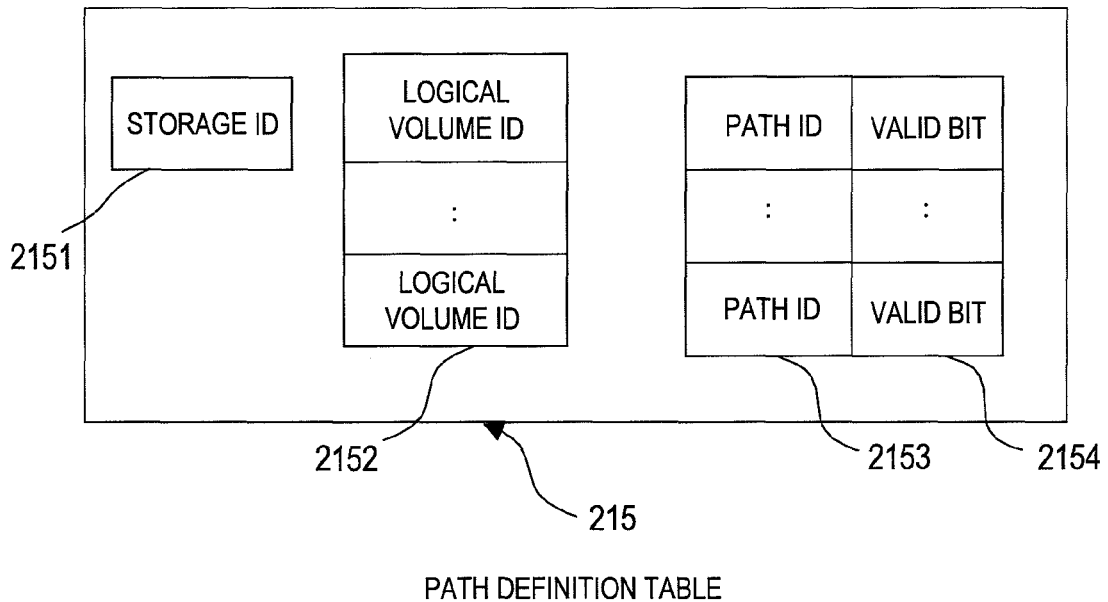
FIG. 9 is a diagram showing a structure of the path definition table stored in the host computer according to the embodiment of this invention.

FIG. 9 is a diagram showing a structure of the path definition table 215 stored in the host computer 200 according to the embodiment of this invention.

The path definition table 215 contains a storage ID 2151, a logical volume ID 2152, a path ID 2153, and a valid bit 2154.

The storage ID 2151 is a unique identifier of a storage system 300 that can be accessed by the host computer 200. The storage ID 2151 stores a storage ID misrepresented by the storage system 300.

The logical volume ID 2152 is a unique identifier of a logical volume supplied by the host computer 200 identified by the storage ID 2151. The logical volume ID 2152 stores a volume ID misrepresented by the storage system 300 and supplied to the host.

The path ID 2153 is a unique identifier of a path used for accessing the logical volume identified by the logical volume ID 2152. The valid bit 2154 indicates whether a path identified by a path ID 2153 of a relevant record is valid or not. In other words, the valid bit 2154 indicates whether the path identified by the path ID 2153 of the record is activated or not.

Figure 10:
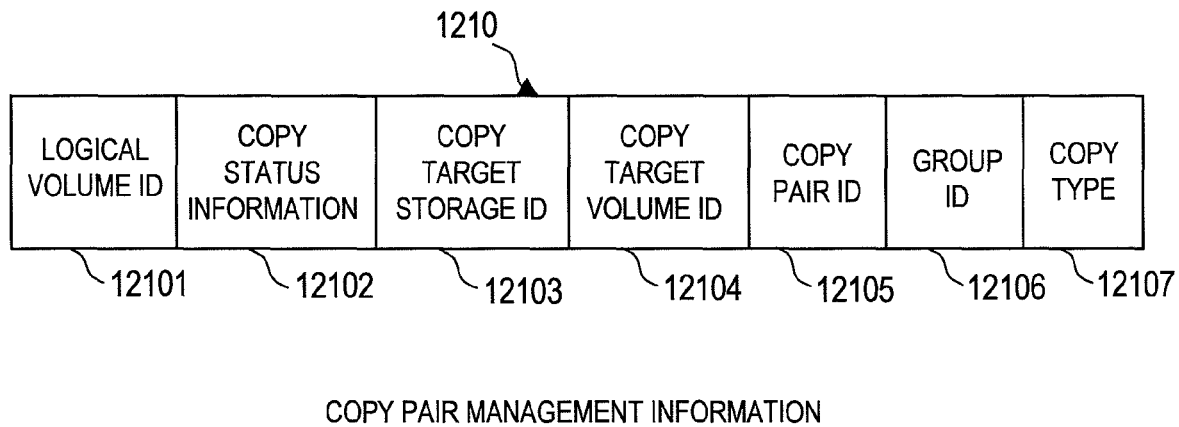
FIG. 10 is a diagram showing a structure of the copy pair management information stored in the storage system according to the embodiment of this invention.

FIG. 10 is a diagram showing a structure of the copy pair management information 1210 stored in the storage system 300 according to the embodiment of this invention.

The copy pair management information 1210 contains a logical volume ID 12101, copy status information 12102, a copy target storage ID 12103, a copy target volume ID 12104, a copy pair ID 12106, a copy group ID 12106, and a copy type 12107.

The logical volume ID 12101 is a unique identifier of a logical volume supplied by the storage system 300 which stores the copy pair management information 1210.

The copy status information 12102 indicates a current copy status for the logical volume identified by the logical volume ID 12101. To be specific, the copy status information 12102 indicates which one of a primary volume, a secondary volume, an initial copy status, a suspension status, and an abnormal status of the inter-storage path, and an abnormal status of copy corresponds to the copying status with respect to the logical volume identified by the logical volume ID 12101.

The copy target volume ID 12104 is a unique identifier of a logical volume making a copy pair with the logical volume identified by the logical volume ID 12101. In other words, the copy target volume ID 12104 is a unique identifier of a logical volume of a copying destination or a copying source of data stored in the logical volume identified by the logical volume ID 12101.

The copy target storage ID 12103 is a unique identifier of a storage system 300 which supplies the logical volume making the copy pair with the logical volume identified by the logical volume ID 12101. In other words, the copy target storage ID 12103 is a unique identifier of the storage system 300 which supplies the logical volume identified by the copy target volume ID 12104.

The copy pair ID 12105 is a unique identifier of the copy pair which includes the logical volume identified by the logical volume ID 12101 and the logical volume identified by the copy target volume ID 12104.

The copy group ID 12106 is a unique identifier of a copy group to which the copy pair identified by the copy pair ID 12105 belongs. The storage system 300 manages a copy group which includes one or more copy pairs. Accordingly, the management computer 100 can designate a copy group to instruct suspension, resumption or dissolving of the operation of the bi-directional synchronous copy.

The copy type 12107 is a copy type executed by the copy pair identified by the copy pair ID 12105. To be specific, the copy type 12107 stores one selected from synchronous copying, asynchronous copying, bi-directional synchronous copy, and bi-directional asynchronous copy. The copy type 12107 of this embodiment stores bi-directional synchronous copy.

Figure 11:
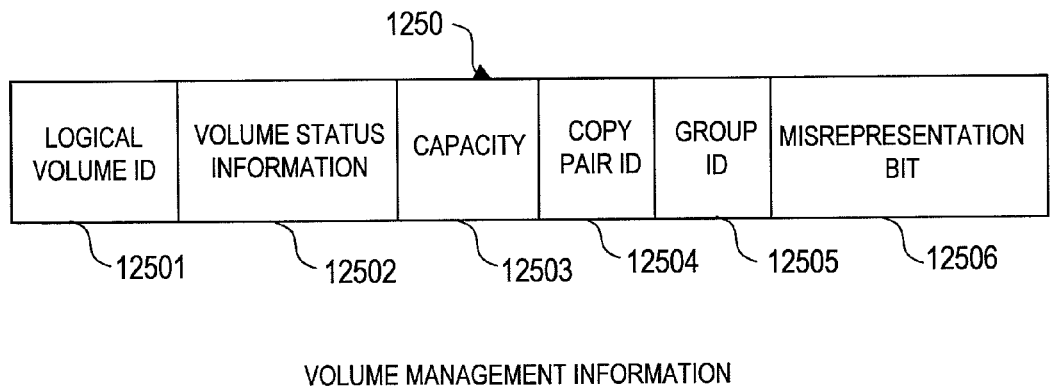
FIG. 11 is a diagram showing a structure of the volume management information stored in the storage system according to the embodiment of this invention.

FIG. 11 is a diagram showing a structure of the volume management information 1250 stored in the storage system 300 according to the embodiment of this invention.

The volume management information 1250 contains a logical volume ID 12501, volume status information 12502, a capacity 12503, a copy pair ID 12504, a copy group ID 12505, and a misrepresentation bit 12506.

The logical volume ID 12101 is a unique identifier of a logical volume supplied by the storage system 300 which stores the volume management information 1250.

The volume status information 12502 indicates a current copy status for the logical volume identified by the logical volume ID 12501. To be specific, the volume status information 12502 stores one selected from primary volume, secondary volume, normal, abnormal, ID misrepresent, and unused.

If the logical volume identified by the logical volume ID 12501 is a primary volume, "primary volume" is stored in the volume status information 12502. If the logical volume identified by the logical volume ID 12501 is a secondary volume, "secondary volume" is stored in the volume status information 12502.

If the host computer 200 can normally access the logical volume identified by the logical volume ID 12501, "normal" is stored in the volume status information 12502. If the host computer 200 cannot normally access the logical volume identified by the logical volume ID 12501, "abnormal" is stored in the volume status information 12502. For example, when a fault occurs in the disk drive 1500, in the initial copy, in the bi-directional synchronous copy, or the like, "abnormal" is stored in the volume status information 12502.

If the storage ID and the logical volume ID of the logical volume identified by the logical volume ID 12501 are misrepresented, "ID misrepresent" is stored in the volume status information 12502.

If no data is stored in the logical volume identified by the logical volume ID 12501, "unused" is stored in the volume status information 12502.

A capacity 12503 is a capacity of the logical volume identified by the logical volume ID 12501. The copy pair ID 12504 is a unique identifier of a copy pair including the logical volume identified by the logical volume ID 12501.

The group ID 12505 is a unique identifier of a copy pair identified by the copy pair ID 12504.

The misrepresentation bit 12506 indicates whether the storage ID and the logical volume ID are misrepresented or not when the logical volume identified by the logical volume ID 12501 is supplied.

Figure 12:
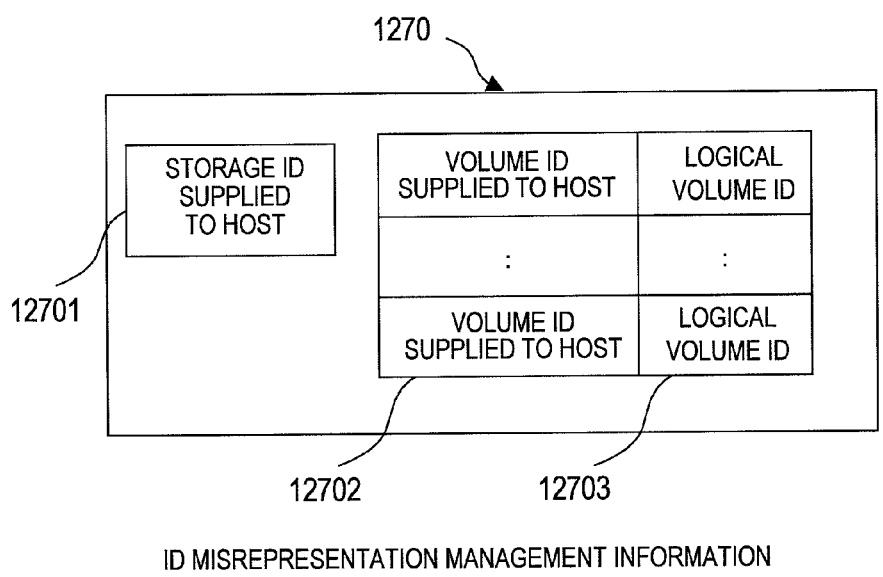
FIG. 12 is a diagram showing a structure of the ID misrepresentation management information stored in the storage system according to the embodiment of this invention.

FIG. 12 is a diagram showing a structure of the ID misrepresentation management information 1270 stored in the storage system 300 according to the embodiment of this invention.

The ID misrepresentation information 1270 contains a storage ID 12701 supplied to the host, a volume ID 12702 supplied to the host, and a logical volume ID 12703.

The storage ID 12701 supplied to the host is an identifier which enables the host computer 200 to identify the storage system 300. In other words, the storage system 300 misrepresents its identifier to the storage ID 12701 supplied to the host, and supplies a logical volume to the host computer 200. Thus, the host computer 200 identifies the storage system 300 based on the storage ID 12701 supplied to the host.

The logical volume ID 12703 is a unique identifier of a logical volume supplied by the storage system 300.

The volume ID 12704 supplied to the host is an identifier which enables the host computer 200 to identify a logical volume identified by a logical volume ID 12703 of a relevant record. In other words, the storage system 300 misrepresents an identifier of the logical volume to the volume ID 12704 supplied to the host, and supplies the logical volume to the host computer 200. Accordingly, the host computer 200 identifies the logical volume based on the volume ID 12702 supplied to the host.

Figure 13:
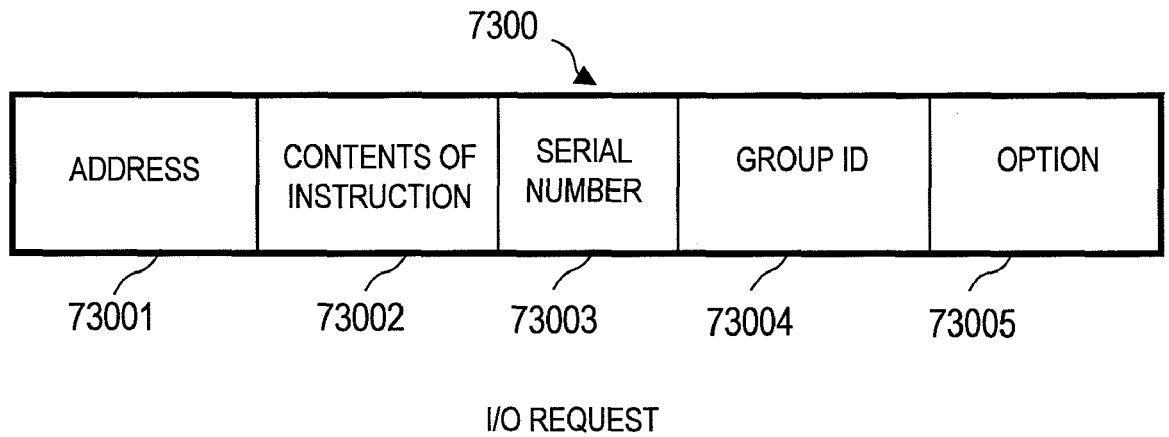
FIG. 13 is an explanatory diagram of an I/O request according to the embodiment of this invention.

FIG. 13 is an explanatory diagram of an I/O request 7300 according to the embodiment of this invention.

The I/O request 7300 is issued by the management computer 100 or the host computer 200.

The I/O request 7300 contains an address 73001, contents of instruction 73002, a serial number 73003, a group ID 73004, and an option 73005.

The address 73001 stores an identifier of a storage system 300 which becomes a transmission destination of the I/O request 7300, and an identifier of a logical volume. According to this embodiment, the address 73001 stores a storage ID supplied to the host, and a volume ID supplied to the host.

The contents of instruction 73002 are contents of a process instructed by the I/O request 7300. For example, the contents of instruction 73002 include a control instruction of remote-copying, or a data access instruction. To be specific, stored as a control instruction of remote-copying in the contents of instruction 73002 are a start, suspension, resumption, dissolving, status acquisition, or the like. Stored as a data access instruction in the contents of instruction 73002 are writing or reading.

The serial number 73003 indicates the order in which the I/O requests 7300 were issued. Thus, the serial number 73003 is decided by the management computer 100 or the host computer 200 which is an issuance source of the I/O request 7300.

The group ID 73004 is a unique identifier of a copy group which is a target of processing to be performed by the I/O request 7300.

The option 73005 stores copy configuration information, option information for assisting the I/O request 7300, data requested to be written by the I/O request 7300, or the like. The copy configuration information contains a copy type, a storage ID of a copying destination, a logical volume ID of a copying destination, a storage ID of a copying source, and a logical volume ID of a copying source, and the like.

Figure 14:
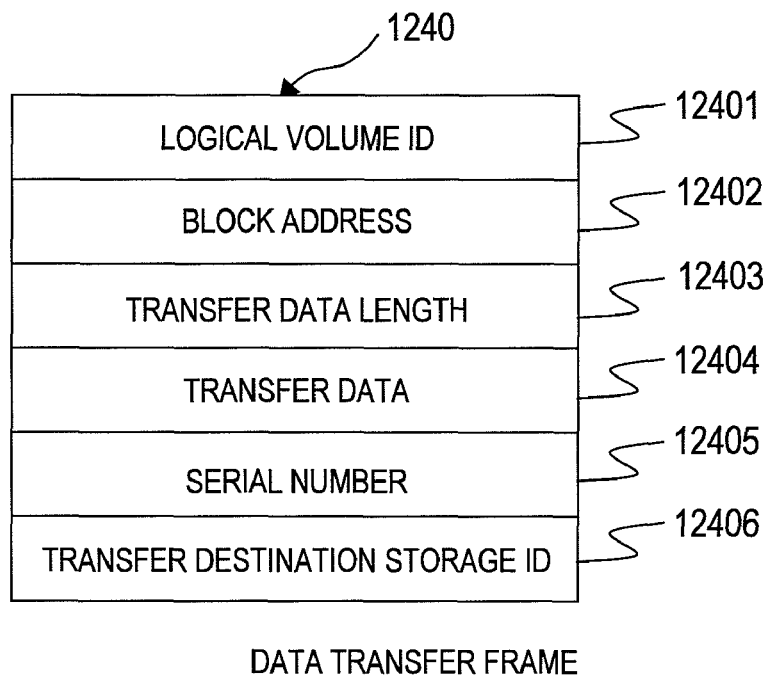
FIG. 14 is an explanatory diagram showing the data transfer frame according to the embodiment of this invention.

FIG. 14 is an explanatory diagram showing the data transfer frame 1240 according to the embodiment of this invention.

The storage system 300 having a logical volume of a copying source transmits the data transfer frame 1240 to the storage system 300 having a logical volume of a copying destination. The storage system 300 executes initial copy and synchronous copying by transmitting/receiving the data transfer frame 1240. To be specific, the data transfer frame 1240 contains a logical volume ID 12401, a block address 12402, a transfer data length 12403, transfer data 12404, a serial number 12405, and a transfer destination storage ID 12406.

The logical volume ID 12401 is a unique identifier of a logical volume which stores the transfer data 12404 contained in the data transfer frame 1240. In other words, the logical volume ID 12401 is a unique identifier of a logical volume which becomes a copying destination of the transfer data 12404 contained in the data transfer frame 1240.

The block address 12402 is a unique identifier of a block which stores the transfer data 12404 contained in the data transfer frame 1240. The transfer data length 12403 is a size of the transfer data 12404 contained in the data transfer frame 1240.

The transfer data 12404 is data transferred by the data transfer frame 1240. The serial number 12405 indicates the order in which the data transfer frames 1240 were created.

The transfer destination storage ID 12406 is a unique identifier of the storage system 300 which becomes a transmission destination of the data transfer frame 1240.

Figure 15:
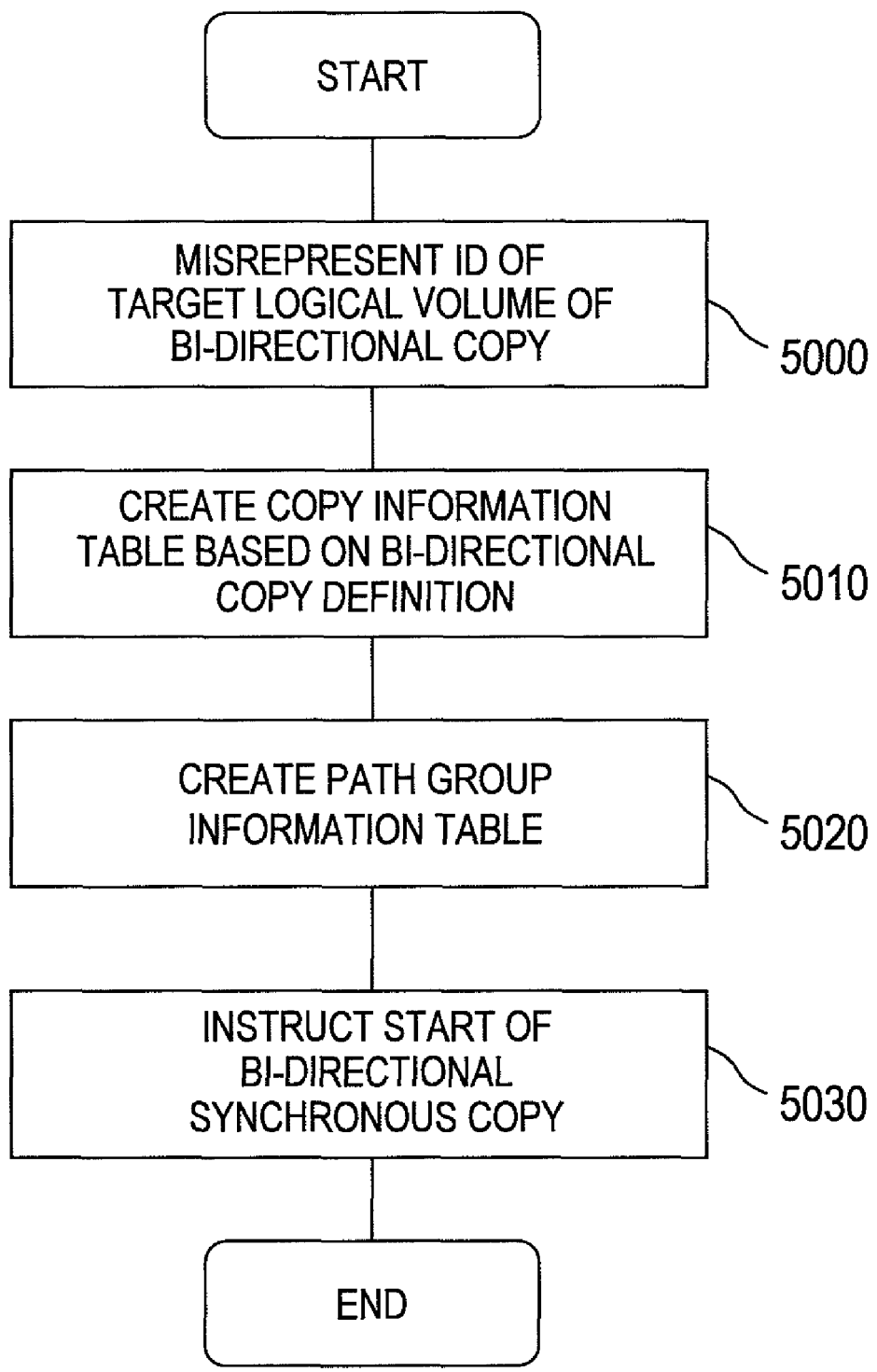
FIG. 15 is a flowchart showing an initial setting process of the computer system according to the embodiment of this invention.

FIG. 15 is a flowchart showing an initial setting process of the computer system according to the embodiment of this invention.

A user inputs an instruction of ID misrepresentation of a logical volume which is a bi-directional synchronous copy operation target to the management terminal 1600. It should be noted that the user may input various information including various instructions to the management computer 100 instead of to the management terminal 1600. At this time, the user designates a logical volume ID of the logical volume which is the bi-directional synchronous copy operation target. Additionally, the user designates a storage ID supplied to the host and a volume ID supplied to the host which are used when the logical volume is supplied. Then, an ID misrepresentation request containing the logical volume ID, the storage ID supplied to the host, and the volume ID supplied to the host, which have been designated, are transmitted by the management terminal 1600 to the storage controller 1000 of the storage system 300.

The storage controller 1000 receives the ID misrepresentation request from the management terminal 1600. Then, the storage controller 1000 extracts, from the received ID misrepresentation request, the logical volume ID, the storage ID supplied to the host, and the volume ID supplied to the host.

Next, the storage controller 1000 updates the ID misrepresentation management information 12703 based on the extracted information. To be specific, the extracted storage ID supplied to the host is stored in the storage ID 12701 supplied to the host in the ID misrepresentation management information 1270, by the storage controller 1000. Then, the extracted volume ID supplied to the host is stored in the volume ID 12702 supplied to the host in the ID misrepresentation management information 1270, by the storage controller 1000. Further, the extracted logical volume ID is stored in the logical volume ID 12703 of the ID misrepresentation management information 1270, by the storage controller 1000.

Subsequently, the storage controller 1000 misrepresents the ID of the logical volume by executing an ID misrepresentation program 1220 (5000). Thus, the host computer 200 can access the logical volume by using the storage ID supplied to the host and the volume ID supplied to the host. However, at this point in time, the storage controller 1000 prohibits the host computer 200 from accessing the ID-misrepresented logical volume.

According to this embodiment, the same storage ID supplied to the host and the same volume ID supplied to the host are given to the two logical volumes which become bi-directional synchronous copy targets. Thus, the host computer 200 recognizes the two logical volumes of the bi-directional synchronous copy targets as one logical volume.

Next, the user inputs a bi-directional synchronous copy definition to the management computer 100. The bi-directional synchronous copy definition is information stored in the copy information table 113. To be specific, the bi-directional synchronous copy definition contains a copy type, a primary storage ID, a primary volume ID, a secondary storage ID, and a secondary volume ID. Then, the management computer 100 creates a copy information table 113 based on the input bi-directional synchronous copy definition (5010).

According to this embodiment, the management computer 100 stores the bi-directional synchronous copy in copy information 1131 of the copy information table 113. Then an identifier of a logical volume (primary volume) of a copying source in initial copy is stored in a primary volume ID 1134 of the copy information table 113 by the management computer 100. The primary volume stores the latest data during the initial copy. A unique identifier of the storage system (primary storage system) 300 which supplies a logical volume identified by the primary volume ID 1134 is stored in a primary storage ID 1133 of the copy information table 113 by the management computer 100.

Next, an identifier of a logical volume (secondary volume) of a copying destination in the initial copy is stored in a secondary volume ID 1136 of the copy information table 113 by the management computer 100. A unique identifier of the storage system (secondary storage system) 300 which supplies a logical volume identified by the secondary volume ID 1136 is stored in a secondary storage ID 1135 of the copy information table 113 by the management computer 100.

Next, the user inputs a path definition to the management computer 100. The path definition is information stored in the path group management table 117. The management computer 100 creates a path group management table 117 based on the input path definition (5020).

To be specific, an identifier of a path (primary path) used for accessing a primary volume is stored in a primary path ID 1172 of the path group management table 117 by the management computer 100. The management computer 100 stores "access prohibited" in a primary path status 1171 of the path group management table 117 as access to the primary volume is not permitted at this time.

An identifier of a path (secondary path) used for accessing a secondary volume is stored in a secondary path ID 1174 of the path group management table 117 by the management computer 100. The management computer 100 stores "access prohibited" in a secondary path status 1173 of the path group management table 117 as access to the secondary volume is not permitted at this time.

Next, the management computer 100 transmits an I/O request 7300 for instructing a start of bi-directional synchronous copy to the primary storage system 300 identified by the primary storage ID 1133 of the copy information table 113 (5030). An option 73005 of the I/O request 7300 stores copy configuration information. The copy configuration information contains a copy type, a storage ID of a copying destination, a logical volume ID of the copying destination, a storage ID of a copying source, a logical volume of a copying source, and copy group ID to which a copy pair belongs.

In this case, the copy type is bi-directional synchronous copy. The storage ID of the copying destination is an identifier of the secondary storage system 300. The logical volume ID of the copying destination is an identifier of the secondary volume. The storage ID of the copying source is an identifier of the primary storage system 300. The logical volume ID of the copying source is an identifier of the primary volume.

Upon reception of the I/O request 7300 for instructing a start of bi-directional synchronous copy, the primary storage system 300 starts an initial copy process. The initial copy process means process for making data in the primary volume coincide with data in the secondary volume. The initial copy process executed by the storage system 300 will be described below in detail with reference to FIG. 16.

Then, the host computer finishes the initial setting process.

Figure 16:
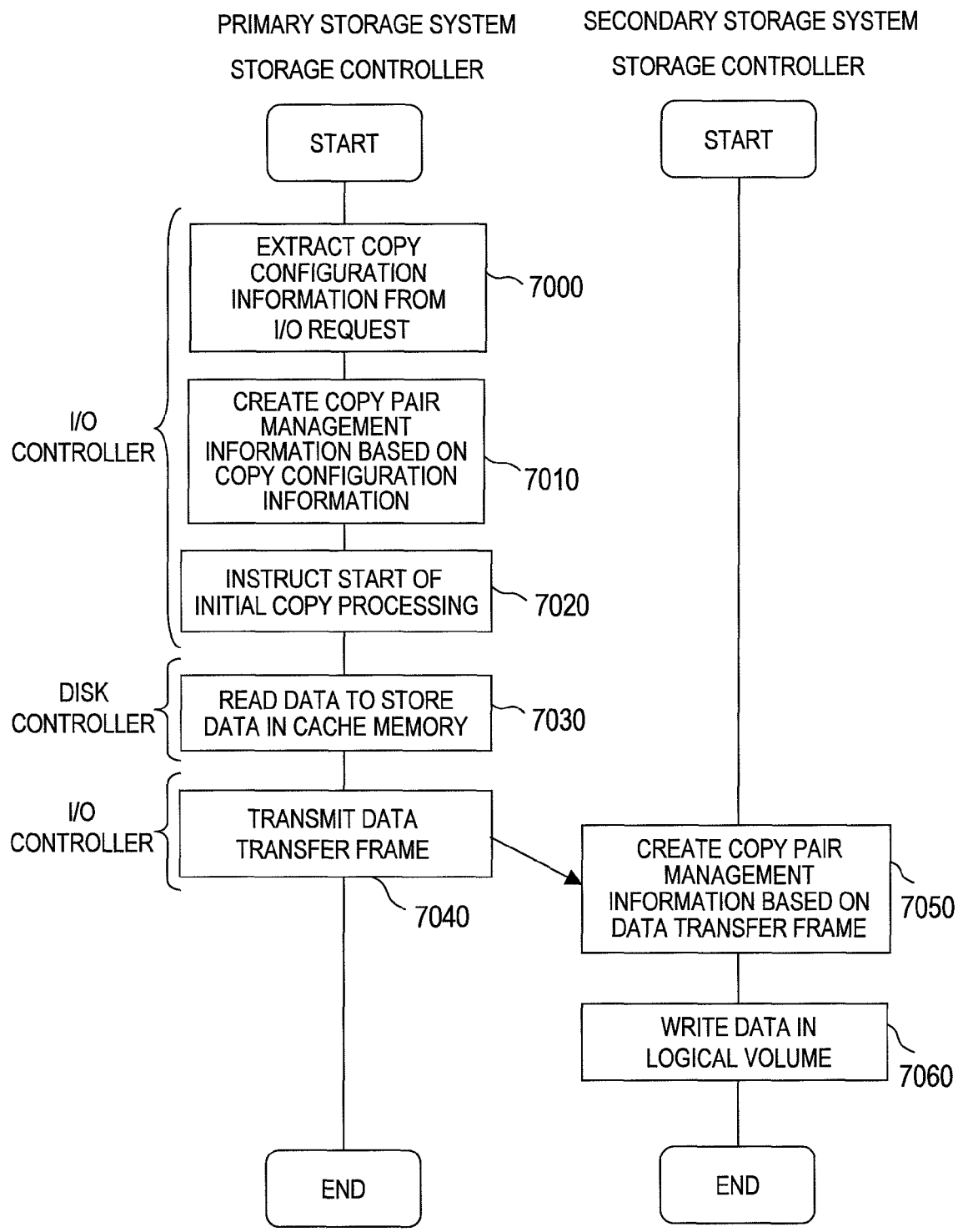
FIG. 16 is a flowchart showing the initial copy process executed by the storage system according to the embodiment of this invention.

FIG. 16 is a flowchart showing the initial copy process executed by the storage system 300 according to the embodiment of this invention.

Upon reception of the I/O request for instructing a start of bi-directional synchronous copy, the I/O controller 1300 of the primary storage system 300 starts an initial copy process.

First, the I/O controller 1300 of the primary storage system 300 extracts copy configuration information from the option 73005 of the received I/O request 7300 (7000).

Then, the I/O controller 1300 of the primary storage system 300 creates copy pair management information 1210 based on the extracted copy configuration information (7010).

To be specific, the I/O controller 1300 of the primary storage system 300 stores "ongoing initial copy" in copy status information 1202 of the copy pair management information 1210. The I/O controller 1300 of the primary storage system 300 stores a logical volume ID of a copying source contained in the extracted copy configuration information in a logical volume ID 12101 of the copy pair management information 1210.

Next, a storage ID of a copying destination contained in the extracted copy configuration information is stored in a copy target storage ID 12103 of the copy pair management information 1210 by the I/O controller 1300 of the primary storage system 300. A logical volume of the copying destination contained in the extracted copy configuration information is stored in a copy target volume ID 12104 of the copy pair management information 1210 by the I/O controller 1300 of the primary storage system 300.

The I/O controller 1300 of the primary storage system 300 stores a unique value in a copy pair ID 12105 of the copy pair management information 1210. A copy group ID contained in the extracted copy configuration information is stored in a copy group ID 12106 of the copy pair management information 1210 by the I/O controller 1300 of the primary storage system 300. A copy type contained in the extracted copy configuration information is stored in a copy type 12107 of the copy pair management information 1210 by the I/O controller 1300 of the primary storage system 300.

Next, the I/O controller 1300 of the primary storage system 300 instructs a start of an initial copy process to a disk controller 1400 of the primary storage system 300 (7020).

Then, the disk controller 1400 of the primary storage system 300 reads data from a logical volume identified by the logical volume ID 12101 of the copy pair management information 1210. The disk controller 1400 of the primary storage system 300 stores the read data in a cache memory 1100 (7030).

The disk controller 1400 of the primary storage system 300 notifies the I/O controller 1300 of the primary storage system 300 of an address of a block from which the data has been read, a data length of the read data, and an address in the cache memory in which the data has been stored.

Then, the I/O controller 1300 of the primary storage system 300 creates a data transfer frame 1240 (shown in FIG. 14) based on the information notified by the disk controller 1400 of the primary storage system 300 and on the copy pair management information 1210.

To be specific, the I/O controller 1300 of the primary storage system 300 stores a copy target storage ID 12103 of the copy pair management information 1210 in a logical volume ID 12401 of the data transfer frame 1240. Then, the block address notified by the disk controller 1400 is stored in a block address 12402 of the data transfer frame 1240 by the I/O controller 1300 of the primary storage system 300.

Next, the data length notified by the disk controller 1400 is stored in a transfer data length 12403 of the data transfer frame 1240 by the I/O controller 1300 of the primary storage system 300. Then, a part or all of the data stored in the cache memory 1100 is stored in transfer data 12404 of the data transfer frame 1240 by the I/O controller 1300 of the primary storage system 300.

The I/O controller 1300 of the primary storage system 300 stores a creating sequence of the data transfer frames 1240 in the initial copy in the serial number 12405 of the data transfer frame 1240. The I/O controller 1300 of the primary storage system 300 stores the copy target storage ID 12103 of the copy pair management information 1210 in the transfer destination storage ID 12406 of the data transfer frame 1240.

The I/O controller 1300 of the primary storage system 300 transmits the created data transfer frame 1240 to the secondary storage system 300 (7040).

Then, the I/O controller 1300 of the secondary storage system 300 receives the data transfer frame 1240. The I/O controller 1300 of the secondary storage system 300 generates copy pair management information 1210 based on the received data transfer frame 1240 or the like (7050).

To be specific, the I/O controller 1300 of the secondary storage system 300 stores a logical volume ID 12401 of the received data transfer frame 1240 in the logical volume ID 12101 of the copy pair management information 1210. The I/O controller 1300 of the secondary storage system 300 stores "ongoing initial copy" in the copy status information 12102 of the copy pair management information 1210.

The I/O controller 1300 of the secondary storage system 300 stores an identifier of the primary storage system 300 which is a transmission source of the received data transfer frame 1240 in the copy target storage ID 12103 of the copy pair management information 1210. The I/O controller 1300 of the secondary storage system 300 stores an identifier of a primary volume in which the transfer data 12404 of the data transfer frame 1240 is stored in the copy target volume ID 12104 of the copy pair management information 1210.

The I/O controller 1300 of the secondary storage system 300 stores "bi-directional synchronous copy" in the copy type 12107 of the copy pair management information 1210.

The I/O controller 1300 of the secondary storage system 300 writes the transfer data 12404 of the data transfer frame 1240 in a logical volume identified by the logical volume ID 12401 of the data transfer frame 1240 (7060).

The primary storage system 300 and the secondary storage system 300 store all data of the primary volume in the secondary volume by repeatedly executing the steps 7030 to 7060.

Then, the primary storage system 300 and the secondary storage system 300 finish the initial copy process. Upon the end of the initial copy, the primary storage system 300 stores "primary volume" in the copy status information 12102 of the copy pair management information 1210. The secondary storage system 300 stores "secondary volume" in the copy status information 12102 of the copy pair management information 1210.

Figure 17:
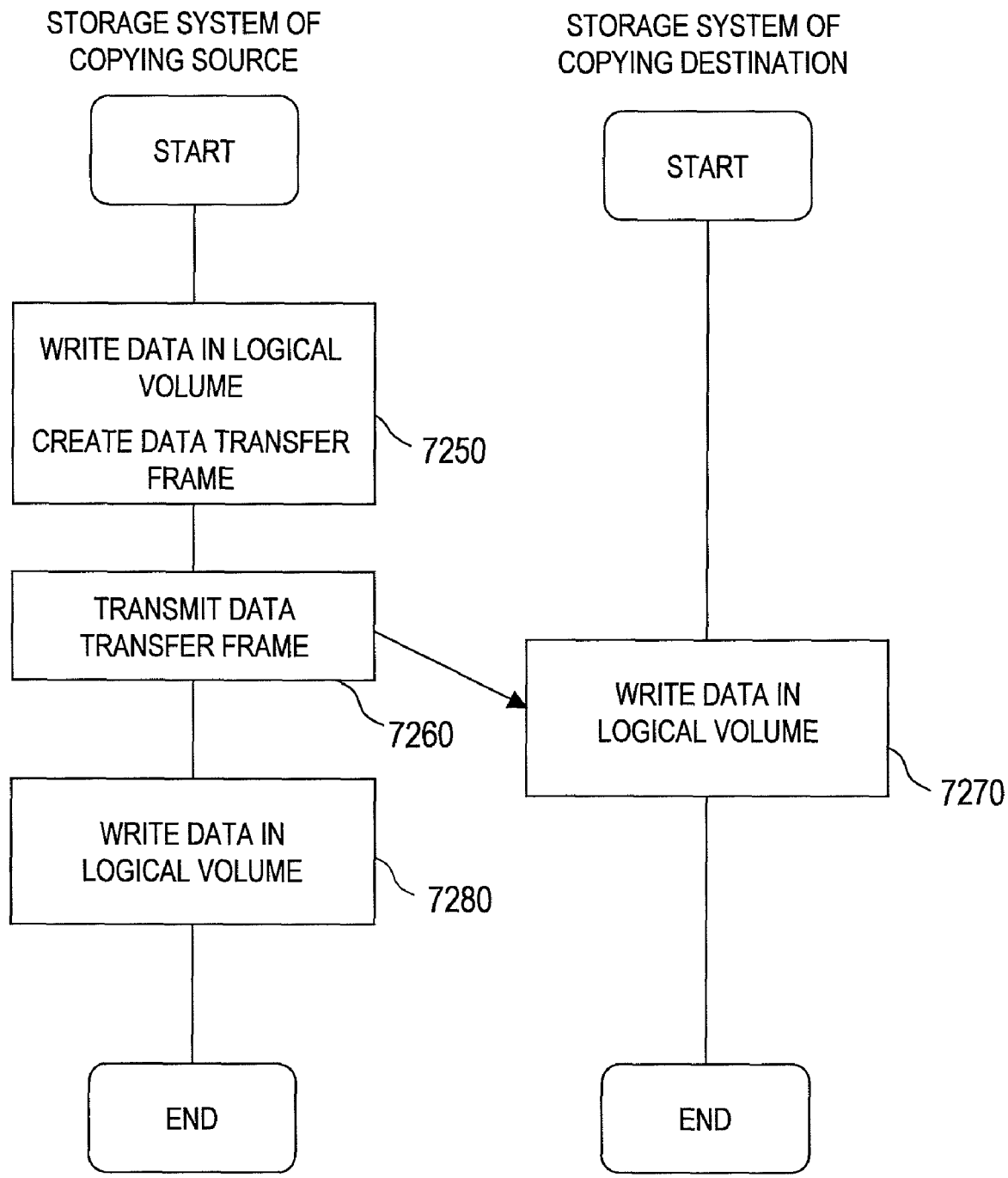
FIG. 17 is a flowchart of a bi-directional synchronous copy process executed by the storage system according to the embodiment of this invention.

FIG. 17 is a flowchart of a bi-directional synchronous copy process executed by the storage system 300 according to the embodiment of this invention.

Upon the end of the initial copy process, the storage system 300 starts a bi-directional synchronous copy operation. In other words, the storage system 300 starts the bi-directional synchronous copy operation after data of the primary volume and the secondary volume match each other.

To be specific, upon reception of a writing request after the end of the initial copy process, the storage system 300 executes the bi-directional synchronous copy process. For example, after writing of data in the primary volume, the primary storage system 300 writes the write data in the secondary volume. Similarly, after writing of data in the secondary volume, the secondary storage system 300 writes the write data in the primary volume.

It should be noted that for the bi-directional synchronous copy process, one storage system 300 can be a copying source or a copying destination. According to this embodiment, the storage system 300 that has received the I/O request from the host computer 200 is set as a storage system 300 of a copying source. Another storage system 300 is then set as a storage system 300 of a copying destination.

The storage system 300 of the copying source receives the I/O request 7300. The I/O request 7300 is a writing request. Then, the storage system 300 of the copying source extracts data (write data) requested to be written from the option 73005 of the I/O request 7300. The storage system 300 of the copying source extracts a storage ID supplied to the host and a volume ID supplied to the host from the address 73001 of the I/O request 7300.

The storage system 300 of the copying source specifies a logical volume in which the data is requested to be written.

To be specific, the storage system 300 of the copying source selects ID misrepresentation management information 1270 in which the extracted storage ID supplied to the host matches the storage ID 12701 supplied to the host in the ID misrepresentation management information 1270. The storage system 300 of the copying source selects a record in which the extracted volume ID supplied to the host matches the volume ID 12704 supplied to the host from the selected ID misrepresentation management information 1270.

The storage system 300 of the copying source extracts a logical volume ID 12703 from the selected record. The storage system 300 of the copying source specifies a logical volume identified by the extracted logical volume ID 12703 as a logical volume in which the data is requested to be written.

The storage system 300 of the copying source suspends writing of the extracted write data with respect to the logical volume identified by the extracted logical volume ID 12703.

The storage system 300 of the copying source creates the data transfer frame 1240 (7250).

To be specific, the storage system 300 of the copying source selects the copy pair management information 1210 in which the extracted logical volume ID 12703 matches the logical volume ID 12101 of the copy pair management information 1210. The storage system 300 of the copying source extracts the copy target storage ID 12103 and the copy target volume ID 12104 from the selected copy pair management information 1210.

The storage system 300 of the copying source stores the extracted copy target volume ID 12104 in the logical volume ID 12401 of the data transfer frame 1240. The storage system 300 of the copying source stores an address of a block in which the write data has been stored in the block address 12402 of the data transfer frame 1240.

The storage system 300 of the copying source stores a size of the write data in a transfer data length 12403 of the data transfer frame 1240. The storage system 300 of the copying source stores a part or all of the write data in the transfer data 12404 of the data transfer frame 1240.

The storage system 300 of the copying source stores the order in which the data transfer frames 1240 were created, in the bi-directional synchronous copy in the serial number 12405 of the data transfer frame 1240.

The storage system 300 of the copying source stores the extracted copy target storage ID 12103 in the transfer destination storage ID 12406 of the data transfer frame 1240.

The storage system 300 of the copying source transmits the created data transfer frame 1240 to the storage system 300 of the copying destination (7260).

The storage system 300 of the copying destination receives the data transfer frame 1240. The storage system 300 of the copying destination writes transfer data 12404 of the data transfer frame 1240 in a logical volume identified by the logical volume ID 12401 of the data transfer frame 1240 (7270).

When the transfer data 12404 is written in the logical volume, the storage system 300 of the copying source executes writing of a suspended status. In other words, the storage system 300 of the copying source writes the extracted writing data in the logical volume identified by the logical volume ID 12703 extracted (7280).

Then, the storage system 300 finishes the bi-directional synchronous copy for one I/O request.

Figure 18:
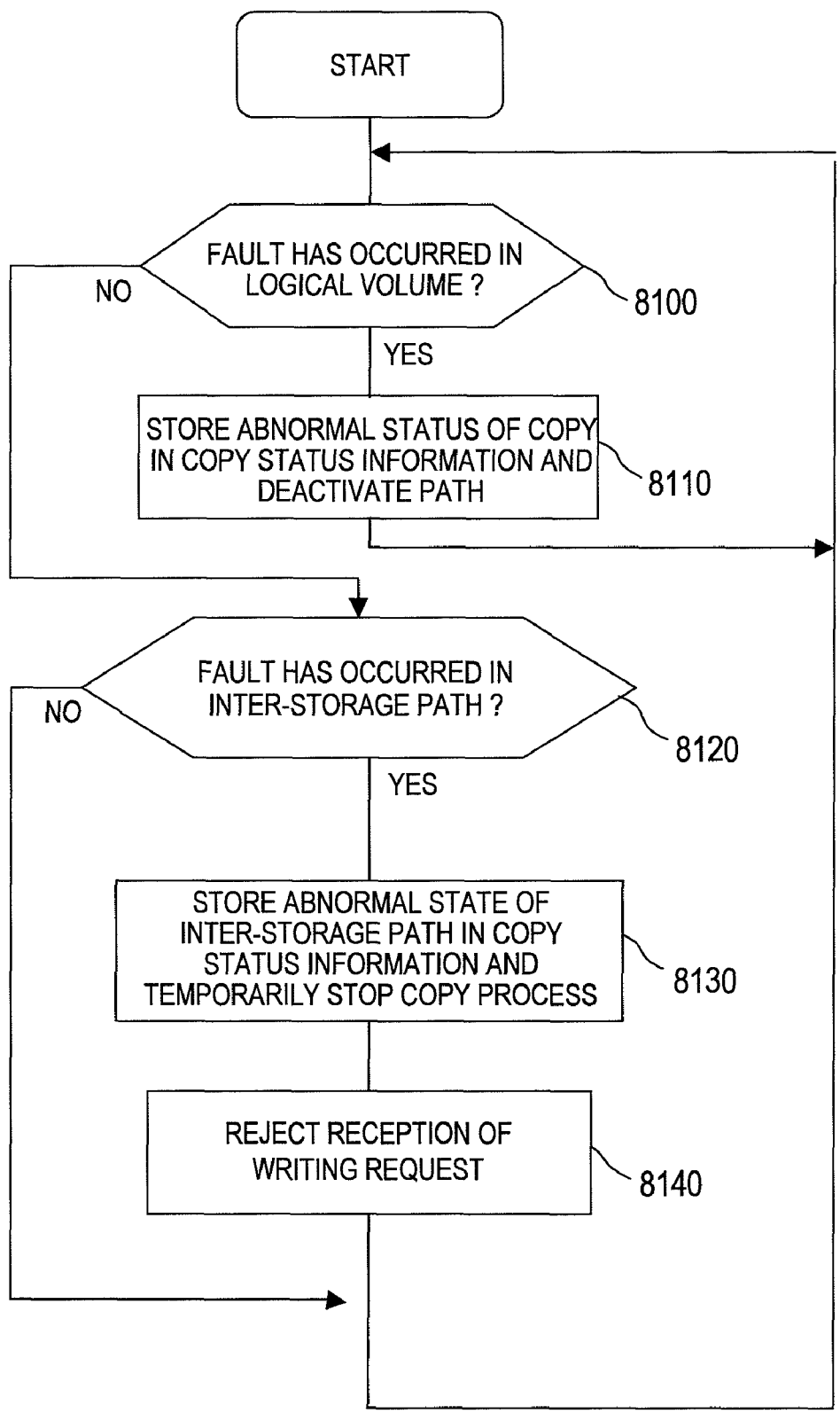
FIG. 18 is a flowchart showing a fault process executed by the storage system according to the embodiment of this invention.

FIG. 18 is a flowchart showing a fault process executed by the storage system 300 according to the embodiment of this invention.

The storage system 300 executes the fault monitoring program 1260 to thereby detect abnormality in various processes including an access process from the host computer 200 to a logical volume, a bi-directional synchronous copy process, and an initial copy process.

First, the storage system 300 judges whether a fault has occurred in a logical volume of the storage system 300 (8100).

If a fault has occurred in the logical volume, the storage system 300 selects, out of the volume management information 1250 stored in the storage system 300, the volume management information 1250 in which an identifier of the logical volume in which the fault has occurred matches the logical volume ID 12501 of the volume management information 1250. The storage system 300 stores "abnormal" in the volume status information 12502 of the volume management information 1250 selected.

The storage system 300 selects, out of the copy pair management information 1210 stored in the storage system 300, the copy pair management information 1210 in which the identifier of the logical volume in which the fault has occurred matches the logical volume ID 12101 of the copy pair management information 1210. The storage system 300 stores "abnormal status of copy" in the copy status information 12102 of the copy pair management information 1210 selected.

Subsequently, the storage system 300 deactivates a path connected to the logical volume in which the fault has occurred (8110). This makes it impossible to access the logical volume in which the fault has occurred. In this case, the host computer 200 detects the deactivation of the path. Then, the host computer 200 continues the access by using a path connected to a logical volume forming a copy pair with the logical volume in which the fault has occurred.

The storage system 300 returns to Step 8100 and repeats the fault process in the bi-directional synchronous copy.

On the other hand, if a fault has not occurred in all the logical volumes, the storage system 300 directly proceeds to Step 8120.

Subsequently, the storage system 300 judges whether a fault has occurred in the inter-storage path (8120). If a fault has occurred in the storage system 300 of the copying destination, the storage system 300 of the copying source also judges that a fault has occurred in the inter-storage path.

If a fault has not occurred in the inter-storage path, the storage system 300 returns to Step 8100 and repeats the fault process.

On the other hand, if a fault has occurred in the inter-storage path, the storage system 300 selects, out of the volume management information 1250 stored in the storage system 300, the volume management information 1250 in which an identifier of a logical volume connected to the inter-storage path in which the fault has occurred matches the logical volume ID 12501 of the volume management information 1250. The storage system 300 stores "abnormal" in the volume status information 12502 of the volume management information 1250 selected.

Subsequently, the storage system 300 selects, out of the copy pair management information 1210 stored in the storage system 300, the copy pair management information 1210 in which the identifier of the logical volume connected to the inter-storage path in which the fault has occurred matches the logical volume ID 12101 of the copy pair management information 1210. The storage system 300 stores "abnormal status of the inter-storage path" in the copy status information 12102 of the copy pair management information 1210 selected.

Moreover, the storage system 300 temporarily stops the copy process performed using the inter-storage path in which the fault has occurred.

The storage system 300 rejects reception of a writing request for the logical volume identified by the logical volume ID 12501 of the volume management information 1250 that has "abnormal" stored as the volume status information 12502.

Moreover, the storage system 300 transmits a notification of the rejection of reception of a request for writing in the host computer 200 (8140). The storage system 300 continues the rejection of reception of a writing request until release of the rejection of reception is instructed.

The storage system 300 returns to Step 8100 and repeats the fault process in the bi-directional synchronous copy.

Next, an access control process to the logical volume by the management computer 100 will be described.

First, an access control process before completion of the initial copy will be described. The management computer 100 controls access to the logical volume by using one of a first access control process (FIG. 19) and a second access control process (FIG. 20) before the completion of the initial copy.

Figure 19:
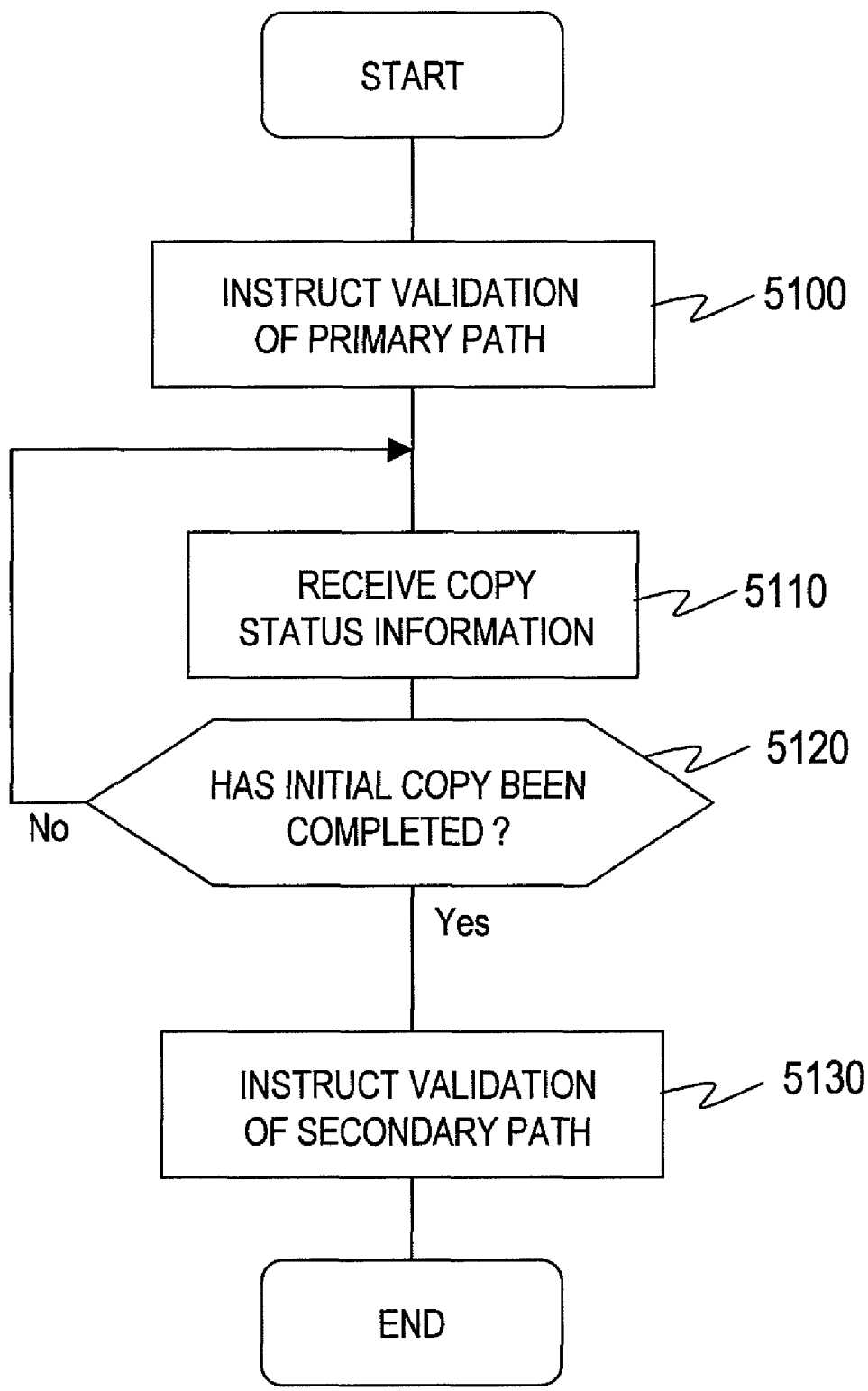
FIG. 19 is a flowchart showing a first access control process before completion of initial copy executed by the management computer according to the embodiment of this invention.

FIG. 19 is a flowchart showing the first access control process before the completion of the initial copy executed by the management computer 100 according to the embodiment of this invention.

First, the management computer 100 instructs validation of the primary path to the host computer 200 before the I/O request 7300 for instructing the start of bi-directional synchronous copy is transmitted (before execution of step 5030 of FIG. 15) (5100). In other words, the management computer 100 permits access only to the primary volume.

The host computer 200 selects a record in which an identifier of the primary path instructed to be validated matches a path ID 2153 of the path definition table 215 from the path definition table 215. The host computer 200 stores a value indicating that the path is valid in a valid bit 2154 of the selected record. Accordingly, the host computer 200 validates the primary path.

Then, the management computer 100 stores "access permitted" in the primary path status 1171 of the path group management table 117.

The management computer 100 transmits the I/O request 7300 for instructing the start of the bi-directional synchronous copy.

Then, the management computer 100 transmits the I/O request 7300 for obtaining copy status information to the primary storage system 300. The primary storage system 300 receives the I/O request 7300 for obtaining the copy status information. Then, the primary storage system 300 extracts copy status information 12102 from the copy pair management information 1210. The primary storage system 300 transmits the extracted copy status information 12102 to the management computer 100.

The management computer 100 receives the copy status information 12102 (5110). The management computer 100 judges whether or not the initial copy of the storage system 300 has been completed (5120). To be specific, if there is "ongoing initial copy" stored in the received copy status information 12102, the management computer 100 judges that the initial copy has not been completed. On the other hand, if there is no "ongoing initial copy" stored in the received copy status information 12102 ("primary volume" has been stored), the management computer 100 judges that the initial copy has been completed.

If the initial copy has not been completed, data of the primary volume and that of the secondary volume do not match each other. Thus, the management computer 100 stands by until the initial copy is completed. The management computer 100 returns to the step 5110.

On the other hand, if the initial copy has been completed, data of the primary volume and that of the secondary volume match each other. Thus, the management computer 100 instructs validation of a secondary path to the host computer 200 (5130). In other words, after the completion of the initial copy, the management computer 100 permits access to the secondary volume.

The host computer 200 selects a record in which an identifier of the secondary path instructed to be validated matches a path ID 2153 of the path definition table 215 from the path definition table 215. The host computer 200 stores a value indicating that the path is valid in the valid bit 2154 of the selected record. Accordingly, the host computer 200 validates the secondary path.

Then, the management computer 100 stores "access permitted" in a secondary path status 1173 of the path group management table 117. The management computer 100 finishes the first access control process before the completion of the initial copy.

As described above, the management computer 100 validates the primary path alone before the completion of the initial copy. In other words, access only to the primary volume is permitted before the completion of the initial copy. After the completion of the initial copy, the management computer 100 validates the secondary path. In other words, after the completion of the initial copy, the management computer 100 permits access to the secondary volume.

According to the first access control process before the completion of the initial copy, the host computer 200 can access the logical volume even during the initial copy. Thus, the host computer 200 can execute AP 211 promptly.

Figure 20:
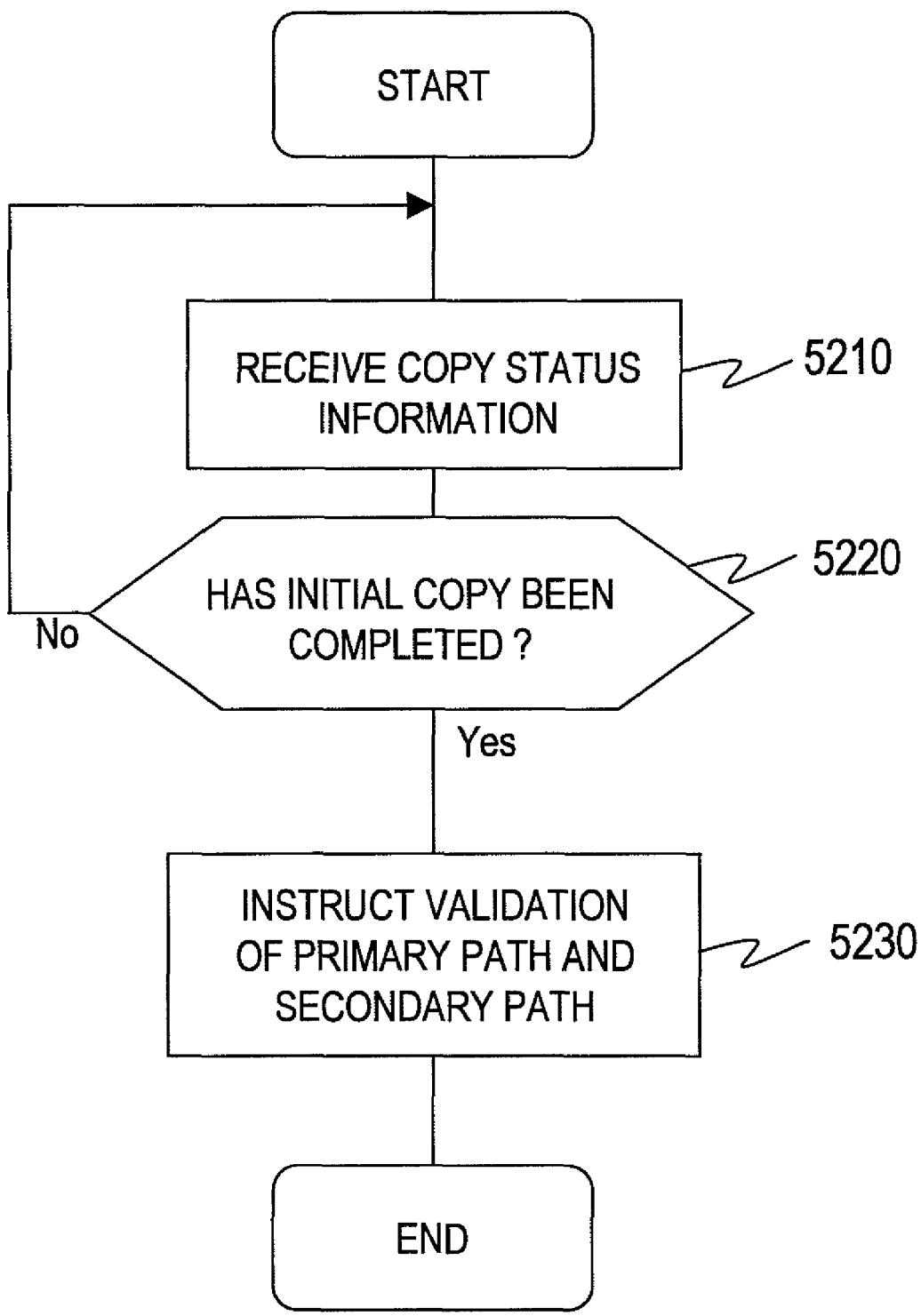
FIG. 20 is a flowchart showing a second access control process before completion of initial copy executed by the management computer according to the embodiment of this invention.

FIG. 20 is a flowchart showing the second access control process before the completion of the initial copy executed by the management computer 100 according to the embodiment of this invention.

Upon transmission of the I/O request 7300 for instructing the start of bi-directional synchronous copy in the step 5030 of FIG. 15, the management computer 100 executes the second access control process before the completion of the initial copy.

First, the management computer 100 transmits the I/O request 7300 for obtaining copy status information to the primary storage system 300. The primary storage system 300 receives the I/O request 7300 for obtaining the copy status information. Then, the primary storage system 300 extracts copy status information 12102 from the copy pair management information 1210. The primary storage system 300 transmits the extracted copy status information 12102 to the management computer 100.

The management computer 100 receives the copy status information 12102 (5210). The management computer 100 then judges whether or not the initial copy of the storage system 300 has been completed (5220). To be specific, if there is "ongoing initial copy" stored in the received copy status information 12102, the management computer 100 judges that the initial copy has not been completed. On the other hand, if there is no "ongoing initial copy" stored in the received copy status information 12102 ("primary volume" has been stored), the management computer 100 judges that the initial copy has been completed.

If the initial copy has not been completed, data of the primary volume and that of the secondary volume do not match each other. Thus, the management computer 100 stands by until the initial copy is completed. The management computer 100 returns to the step 5210.

On the other hand, if the initial copy is completed, data of the primary volume and that of the secondary volume match each other. Thus, the management computer 100 instructs validation of the primary path and the secondary path to the host computer 200 (5230). In other words, after the completion of the initial copy, the management computer 100 permits access to the primary volume and the secondary volume.

The host computer 200 selects a record in which an identifier of the primary path instructed to be validated matches the path ID 2153 of the path definition table 215 from the path definition table 215. The host computer 200 stores a value indicating that the path is valid in the valid bit 2154 of the selected record. Accordingly, the host computer 200 validates the primary path.

Similarly, the host computer 200 selects a record in which an identifier of the secondary path instructed to be validated matches the path ID 2153 of the path definition table 215 from the path definition table 215. The host computer 200 stores a value indicating that the path is valid in the valid bit 2154 of the selected record. Accordingly, the host computer 200 validates the secondary path.

Then, the management computer 100 stores "access permitted" in the primary path status 1171 and the secondary path status 1173 of the path group management table 117. The management computer 100 finishes the second access control process before the completion of the initial copy.

As described above, the management computer 100 deactivates the primary path and the secondary path before the completion of the initial copy. In other words, access to the primary volume and the secondary volume is prohibited until the completion of the initial copy. After the completion of the initial copy, the management computer 100 validates the primary path and the secondary path. In other words, after the completion of the initial copy, the management computer 100 permits access to the primary volume and the secondary volume.

A process for a fault that has occurred during bi-directional synchronous copy or an initial copy process will be explained.

Figure 21:
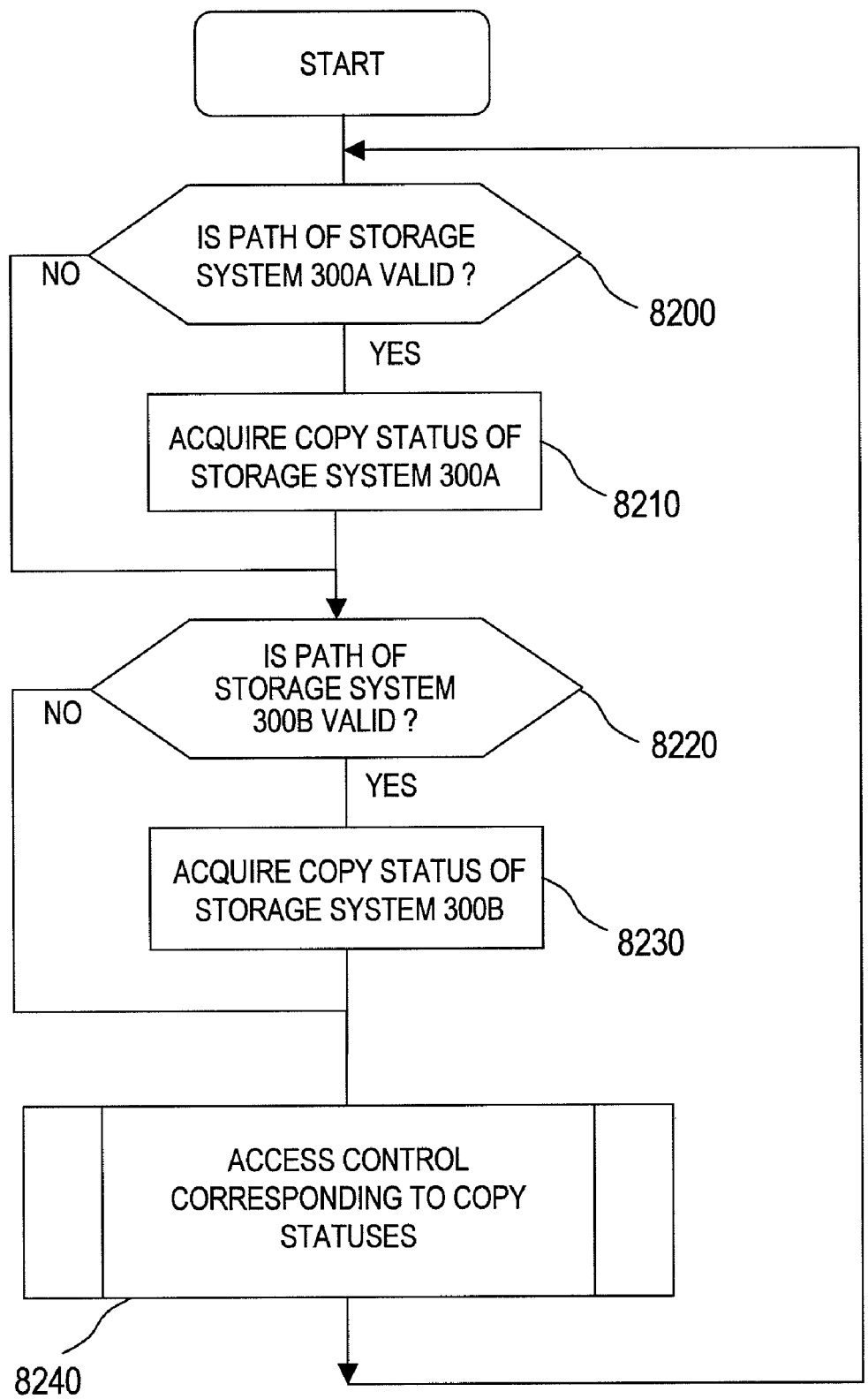
FIG. 21 is a flowchart showing an access control process at a time of failure detection executed by the management computer according to the embodiment of this invention.

FIG. 21 is a flowchart showing an access control process at the time of fault detection executed by the management computer 100 according to the embodiment of this invention.

The flowchart is a flowchart in the case in which a fault in the storage system 300A or the storage system 300B is detected.

When a fault occurs in an access from the host computer 200 to at least one of the storage systems 300A and 300B, the host computer 200 detects an I/O fault. For example, upon reception of notification of failure in a process of a writing request, the host computer 200 judges the notification as detection of an I/O fault.

When the I/O fault is detected, the host computer 200 notifies the management computer 100 of the detection of the I/O fault.

The management computer 100 receives the notification of the detection of the I/O fault from the host computer 200. The management computer 100 requests acquisition of a status of a path connecting the host computer 200 and the storage system 300A from the host computer 200 of the notification source of the detection of the I/O fault.

Upon receipt of the acquisition request for a status of the path, the host computer 200 acquires a status of the path requested to be acquired. Specifically, the host computer 200 performs a fault detection process for the path (path health check).

For example, the host computer 200 transmits a fault detection signal to the storage system 300A using the path, a status of which is desired to be acquired. Then, the storage system 300A transmits a status of the path to the host computer 200. This allows the host computer 200 to acquire a status of the path.

The host computer 200 transmits the status of the path acquired to the management computer 100.

The management computer 100 receives the status of the path from the host computer 200. The management computer 100 judges, on the basis of the status of the path received, whether the path connecting the host computer 200 and the storage system 300A is in a valid status (8200).

When the path is in an invalid status, the management computer 100 sets a path deactivation status as copy status information of the storage system 300A. The management computer 100 directly proceeds to Step 8220.

On the other hand, when the path is in a valid status, the management computer 100 acquires the copy status information 12102 of the copy pair management information 1210 from the storage system 300A through the data communication line 510 or a device control line 550 (8210). When the copy status information 12102 is acquired through the device control line 550, the management computer 100 may acquire the copy status information 12102 through asynchronous notification containing an SNMP or the like from the storage system 300A.

The management computer 100 requests acquisition of a status of a path connecting the host computer 200 and the storage system 300B from the host computer 200 of the notification source of the I/O fault detection.

Upon receipt of the acquisition request for a status of the path, the host computer 200 acquires a status of the path requested to be acquired. The host computer 200 transmits the status of the path acquired to the management computer 100.

The management computer 100 receives the status of the path from the host computer 200. The management computer 100 judges, on the basis of the status of the path received, whether the path connecting the host computer 200 and the storage system 300B is in a valid status (8220).

When the path is in an invalid status, the management computer 100 sets a path deactivation status as copy status information of the storage system 300B. The management computer 100 directly proceeds to Step 8240.

On the other hand, when the path is in a valid status, the management computer 100 acquires the copy status information 12102 of the copy pair management information 1210 from the storage system 300B through the data communication line 510 or the device control line 550 (8240).

Subsequently, the management computer 100 performs, on the basis of a judgment table shown in FIG. 22, access control corresponding to the copy status information acquired (8240).

The management computer 100 returns to Step 8200 and repeats the access control process.

FIG. 22 is an explanatory diagram of the judgment table referred to by the management computer 100 according to the embodiment of this invention.

The management computer 100 performs, on the basis of the judgment table of the explanatory diagram, access control corresponding to copy status information of the storage system 300A and copy status information of the storage system 300B. The copy status information indicates any one of a path deactivation status, a primary volume, a secondary volume, initial copying, temporarily stopped, an abnormal status of the inter-storage path, and an abnormal status of copy.

First, a description will be made of a case where copy status information of one of the storage systems 300A and 300B indicates an abnormal status of the inter-storage path and copy status information of the other indicates a path deactivation status, an abnormal status of copy, temporarily stopped, or initial copying. In this case, the management computer 100 performs specific path control.

Specifically, the management computer 100 instructs the storage system 300 of an acquisition source of the copy status information indicating the abnormal status of the inter-storage path to release the rejection of reception of a writing request. Upon receipt of the instruction for release of the rejection of reception of a writing request, the storage system 300 stores "temporarily stopped" in the copy status information 12102 of the copy pair management information 1210. The storage system 300 releases the rejection of reception of a writing request.

Moreover, the management computer 100 instructs the other storage system 300 to deactivate a path connecting the host computer 200 and the storage system 300 of an acquisition source of the copy status information indicating the path deactivation status, the abnormal status of copy, temporarily stopped, or initial copying. Upon receipt of the instruction for deactivation of the path, the storage system 300 deactivates the path instructed to be deactivated.

Description will be made of a case where copy status information of one of the storage systems 300A and 300B indicates the primary volume or the secondary volume and copy status information of the other indicates the abnormal status of copy. In this case, the management computer 100 also performs specific path control.

Specifically, the management computer 100 instructs the storage system 300 of an acquisition source of the copy status information indicating the primary volume or the secondary volume to release the rejection of reception of a writing request. Upon receipt of the instruction for release of the rejection of reception of a writing request, the storage system 300 stores "temporarily stopped" in the copy status information 12102 of the copy pair management information 1210. The storage system 300 releases the rejection of reception of a writing request.

Moreover, the management computer 100 instructs the storage system 300 of an acquisition source of the copy status information indicating the abnormal status of copy to deactivate the path connecting the storage system 300 and the host computer 200. Upon receipt of the instruction for deactivation of the path, the storage system 300 deactivates the path instructed to be deactivated.

Description will be made of a case where copy status information of one of the storage systems 300A and 300B indicates the abnormal status of the inter-storage path and copy status information of the other indicates the abnormal status of the inter-storage path, the primary volume, or the secondary volume. In this case, the management computer 100 performs arbitrary path control.

Specifically, the management computer 100 instructs arbitrary one of the storage systems 300A and 300B to release the rejection of reception of a writing request. Upon receipt of the instruction for release of the rejection of reception of a writing request, the storage system 300 stores "temporarily stopped" in the copy status information 12102 of the copy pair management information 1210. The storage system 300 releases the rejection of reception of a writing request.

Moreover, the management computer 100 instructs the other storage system 300 to deactivate a path connecting the other storage system 300 and the host computer 200. Upon receipt of the instruction for deactivation of the path, the storage system 300 deactivates the path instructed to be deactivated.

When copy status information is other than those described above, the management computer 100 does not perform access control. The management computer 100 may output occurrence of an I/O fault using a console message, a log, or a mail.

According to this embodiment, the two storage systems 300 supply the logical volumes having identical ID's to the host computer 200. The two storage systems 300 execute bi-directional remote-copying between the logical volumes having the identical ID's. Thus, the two storage systems 300 match the data of the logical volumes having the identical ID's with each other.

The host computer 200 accesses the two logical volumes having the identical ID's as one logical volume. Accordingly, the host computer 200 can access the same data even when access is made to any one of the two storage systems 300 which supply the logical volumes having the identical ID's. Thus, it is possible to enhance I/O processing performance of the host computer 200.

Even if a fault occurs in one of the two storage systems 300, which provide logical volumes identified by an identical ID, or the inter-storage path, the host computer 200 can access the storage system 300 in which a fault has not occurred. Therefore, the host computer 200 can continue an access to data.

While the present invention has been described in detail and pictorially in the accompanying drawings, the present invention is not limited to such detail but covers various obvious modifications and equivalent arrangements, which fall within the purview of the appended claims.

What is claimed is:

1. A computer system, comprising:
one or more first storage systems;
one or more second storage systems;
one or more host computers coupled to the first storage system and to the second storage system through a network; and
a management computer capable of accessing the first storage system, the second storage system, and the host computers, wherein:
the first storage system includes:
a first interface coupled to the network;
a first processor coupled to the first interface,
a first memory coupled to the first processor; and
a first disk drive for storing data requested to be written by the host computer;
the first storage system sets a storage area of the first disk drive as one or more first volume;
the first storage system misrepresents an identifier of the storage system and an identifier of the first volume to the host computer;
the first storage system provides the set first volume to the host computer,
the second storage system includes:
a second interface coupled to the network;
a second processor coupled to the second interface;
a second memory coupled to the second processor; and
a second disk drive for storing data requested to be written by the host computer;
the second storage system sets a storage area of the second disk drive as one or more second volume;
the second storage system misrepresents an identifier of the storage system and an identifier of the second volume as being identical to those misrepresented by the first storage system to the host computer;
the second storage system provides the set second volume to the host computer;
the management computer includes: a third interface externally coupled; a third processor coupled to the third interface; and a third memory coupled to the third processor;
the host computer includes: a fourth interface coupled to the network; a fourth processor coupled to the fourth interface; and a fourth memory coupled to the fourth processor;
the first processor copies data stored in the first volume into the second volume;
the second processor copies data stored in the second volume into the first volume;
the third processor, upon detection of one of a failure in an access from the host computer to the first volume and a failure in an access from the host computer to the second volume:
acquires a status of copying between the first volume and the second volume and a status of the first volume from the first processor through the third interface;

acquires a status of copying between the first volume and the second volume and a status of the second volume from the second processor through the third interface; and refers to the plurality of acquired statuses to control the access from the host computer to the first volume and the access from the host computer to the second volume.

2. The computer system according to claim 1, wherein:
the first processor rejects reception of a request for writing in the first volume upon detection of a fault; and
the second processor rejects reception of a request for writing in the second volume upon detection of a fault.

3. The computer system according to claim 2, wherein:
the third processor requests, in a case where the status of the first storage system acquired from the first processor indicates abnormality, the first processor to deactivate a path connecting the host computer and the first storage system, through the third interface; and
the third processor requests, in a case where the status of the second storage system acquired from the second processor indicates abnormality, the second processor to deactivate a path connecting the host computer and the second storage system, through the third interface.

4. The computer system according to claim 2, wherein the third processor requests, in a case where the status of the first storage system acquired from the first processor and the status of the second storage system acquired from the second processor indicate normality, one of the first processor and the second processor to release one of the rejection of reception of a request for writing in the first volume and the rejection of reception of a request for writing in the second volume, through the third interface.

5. The computer system according to claim 2, wherein the third processor requests, in a case where the status of the first storage system acquired from the first processor and the status of the second storage system acquired from the second processor indicate normality, one of the first processor and the second processor to deactivate one of a path connecting the host computer and the first storage system and a path connecting the host computer and the second storage system, through the third interface.

6. The computer system according to claim 2, wherein:
the third processor requests, in a case where the status of copying acquired from the first processor indicates abnormality and the status of the first storage system acquired from the first processor indicates normality, the first processor to release the rejection of reception of a request for writing in the first volume, through the third interface; and
the third processor requests, in a case where the status of copying acquired from the second processor indicates abnormality and the status of the second storage system acquired from the second processor indicates normality, the second processor to release the rejection of reception of a request for writing in the second volume, through the third interface.

7. An access control method for a computer system,
the computer system including: one or more first storage systems; one or more second storage systems; one or more host computers coupled to the first storage systems and to the second storage systems through a network; and a management computer capable of accessing the first storage systems, the second storage systems, and the host computers,
the first storage system including: a first interface coupled to the network; a first processor coupled to the first interface; a first memory coupled to the first processor; and a first disk drive for storing data requested to be written by the host computer,
the second storage system including: a second interface coupled to the network; a second processor coupled to the second interface; a second memory coupled to the second processor; and a second disk drive for storing data requested to be written by the host computer,
the management computer including: a third interface externally coupled; a third processor coupled to the third interface; and a third memory coupled to the third processor,
the host computer including: a fourth interface coupled to the network; a fourth processor coupled to the fourth interface; and a fourth memory coupled to the fourth processor,
the access control method comprising the steps of:
setting a storage area of the first disk drive as one or more first volumes;
misrepresenting an identifier of the storage system and an identifier of the first volume to the host computer;
providing the set first volume to the host computer;
setting a storage area of the second disk drive as one or more second volumes;
misrepresenting an identifier of the storage system and an identifier of the second volume as being identical to those misrepresented by the first storage system to the host computer;
providing the set second volume to the host computer;
copying data stored in the first volume into the second volume;
copying data stored in the second volume into the first volume;
acquiring, upon detection of one of a failure in an access from the host computer to the first volume and a failure in an access from the host computer to the second volume, a status of copying between the first volume and the second volume and a status of the first storage system from the first processor;
acquiring a status of copying between the first volume and the second volume and a status of the second storage system from the second processor; and
controlling, with reference to the plurality of acquired statuses, the access from the host computer to the first volume and the access from the host computer to the second volume.

8. The access control method according to claim 7, further comprising the steps of:
rejecting reception of a request for writing in the first volume in a case where the first processor detects a fault; and
rejecting reception of a request for writing in the second volume in a case where the second processor detects a fault.

9. The access control method according to claim 8, wherein, the step of controlling the accesses includes:
releasing, in a case where the status of copying acquired from the first processor indicates abnormality and the status of the first storage system acquired from the first processor indicates normality, the rejection of reception of a request for writing in the first volume; and
releasing, in a case where the status of copying acquired from the second processor indicates abnormality and the status of the second storage system acquired from the second processor indicates normality, the rejection of reception of a request for writing in the second volume.

10. The access control method according to claim 8, wherein the step of controlling the accesses includes:
- deactivating, in a case where the status of the first storage system acquired from the first processor indicates abnormality, a path connecting the host computer and the first storage system; and
- deactivating, in a case where the status of the second storage system acquired from the second processor indicates abnormality, a path connecting the host computer and the second storage system.

11. The access control method according to claim 8, wherein the step of controlling the accesses includes releasing, in a case where the status of the first storage system acquired from the first processor and the status of the second storage system acquired from the second processor indicate normality, one of the rejection of reception of a request for writing in the first volume and the rejection of reception of a request for writing in the second volume.

12. The access control method according to claim 8, wherein the step of controlling the accesses includes deactivating, in a case where the status of the first storage system acquired from the first processor and the status of the second storage system acquired from the second processor indicate normality, one of a path connecting the host computer and the first storage system and a path connecting the host computer and the second storage system.

13. A management computer, comprising:
- an interface capable of accessing one or more first storage systems, one or more second storage systems, and one or more host computers coupled to the first and second storage systems through a network;
- a processor coupled to the interface; and
- a memory coupled to the processor, wherein:
- the first storage system includes a first disk drive for storing data requested to be written by the host computer;
- the first storage system sets a storage area of the first disk drive as one or more first volume;
- the first storage system misrepresents an identifier of the storage system and an identifier of the first volume to the host computer;
- the first storage system provides the set first volume to the host computer;
- the second storage system includes a second disk drive for storing data requested to be written by the host computer;
- the second storage system sets a storage area of the second disk drive as one or more second volume;
- the second storage system misrepresents an identifier of the storage system and an identifier of the second volume as being identical to those misrepresented by the first storage system to the host computer;
- the second storage system provides the set second volume to the host computer;
- the first storage system:
  - copies data in the first volume to the second volume; and
  - rejects, upon detection of a fault, reception of a request for writing in the first volume;
- the second storage system:
  - copies data in the second volume to the first volume; and
  - rejects, upon detection of a fault, reception of a request for writing in the second volume; and
- the processor, upon detection of one of a failure in an access from the host computer to the first volume and a failure in an access from the host computer to the second volume:
  - acquires a status of copying between the first volume and the second volume and a status of the first storage system from the first storage, through the interface;
  - acquires a status of copying between the first volume and the second volume and a status of the second storage system from the second storage system, through the interface; and
  - controls, with reference to the plurality of acquired statuses, the access from the host computer to the first volume and the access from the host computer to the second volume.

14. The management computer according to claim 13, wherein:
- the processor requests, in a case where the status of copying acquired from the first storage system indicates abnormality and the acquired status of the first storage system indicates normality, the first storage system to release the rejection of reception of a request for writing in the first volume, through the interface; and
- the processor requests, in a case where the status of copying acquired from the second storage system indicates abnormality and the acquired status of the second storage system indicates normality, the second storage system to release the rejection of reception of a request for writing in the second volume, through the interface.

15. The management computer according to claim 13, wherein:
- the processor requests, in a case where the acquired status of the first storage system indicates abnormality, the first storage system to deactivate a path connecting the host computer and the first storage system, through the interface; and
- the processor requests, in a case where the acquired status of the second storage system indicates abnormality, the second storage system to deactivate a path connecting the host computer and the second storage system, through the interface.

16. The management computer according to claim 13, wherein the processor requests, in a case where the acquired status of the first storage system and the acquired status of the second storage system indicate normality, one of the first storage system and the second storage system to release one of the rejection of reception of a request for writing in the first volume and the rejection of reception of a request for writing in the second volume, through the interface.

17. The management computer according to claim 13, wherein the processor requests, in a case where the acquired status of the first storage system and the acquired status of the second storage system indicate normality, one of the first storage system and the second storage system to deactivate one of a path connecting the host computer and the first storage system and a path connecting the host computer and the second storage system, through the interface.

* * * * *